United States Patent [19]

Haskin

[11] Patent Number: 5,426,645
[45] Date of Patent: Jun. 20, 1995

[54] PARALLEL RULE-BASED DATA TRANSMISSION METHOD AND APPARATUS

[76] Inventor: Marvin E. Haskin, 400 Bryn Mawr Ave., Bryn Mawr, Pa. 19010

[21] Appl. No.: 120,199

[22] Filed: Sep. 13, 1993

Related U.S. Application Data

[63] Continuation of Ser. No. 697,006, May 8, 1991, abandoned.

[51] Int. Cl.⁶ ............................................. H04B 15/00
[52] U.S. Cl. ...................................... 370/118; 375/240
[58] Field of Search .................. 370/94.1, 118, 112, 370/109, 110.1, 84, 95.1, 60, 58.1, 58.2, 79; 381/29, 30, 31, 32, 34; 375/122; 341/79, 51, 87; 358/133, 136; 340/825.01; 348/384

[56] References Cited

U.S. PATENT DOCUMENTS

| | | | |
|---|---|---|---|
| 3,435,134 | 3/1969 | Richards | 375/122 |
| 4,311,877 | 1/1982 | Kahn | 340/825.01 |
| 4,464,767 | 8/1984 | Bremer | 375/67 |
| 4,577,312 | 3/1986 | Nash | 370/118 |
| 4,581,737 | 4/1986 | Sparrell | 370/118 |
| 4,598,411 | 7/1986 | Berkovich et al. | 370/118 |
| 4,608,684 | 8/1986 | Upp | 370/58 |
| 4,679,191 | 7/1987 | Nelson et al. | 370/118 |
| 4,704,716 | 11/1987 | Bowers et al. | 370/58 |
| 4,730,348 | 3/1988 | MacCrisken | 375/122 |
| 4,734,907 | 3/1988 | Turner | 370/60 |
| 4,755,994 | 9/1988 | Stapler et al. | 375/122 |
| 4,829,227 | 5/1989 | Turner | 370/60 |
| 4,862,456 | 8/1989 | Giorgio | 370/118 |
| 4,885,738 | 12/1989 | Bowers et al. | 370/58.1 |
| 4,890,282 | 12/1989 | Lambert et al. | 370/79 |
| 4,891,805 | 1/1990 | Fallin | 370/95.1 |
| 4,939,722 | 7/1990 | Beichler | 370/84 |
| 4,965,787 | 10/1990 | Almond et al. | 370/58.1 |
| 4,975,771 | 12/1990 | Kassatly | 370/118 |
| 5,034,968 | 7/1991 | Willey et al. | 375/122 |
| 5,115,309 | 5/1992 | Hang | 370/118 |

*Primary Examiner*—Douglas W. Olms
*Assistant Examiner*—Dang Ton
*Attorney, Agent, or Firm*—Thomas M. Champagne; Jon L. Roberts; Roberts & Associates

[57] ABSTRACT

A parallel rule-based data transmission method and apparatus is described comprising multiple computer ports, modems, and multiple data transmission channels. The invention incorporates hardware and software data compression, automatic line selection and port allocation, data file segmentation and reassembly and simultaneous data transmission over multiple communications channels and their associated modems or ISDN interfaces. The invention allows a true multi-tasking environment to exist over inexpensive data communication channels thereby increasing the speed of data transmission as well as decreasing the cost associated with such transmission.

21 Claims, 5 Drawing Sheets

PARALLEL RULE-BASED DATA TRANSMISSION METHOD AND APPARATUS

This application is a continuation of application Ser. No. 697,006 filed May 8, 1991, now abandoned.

FIELD OF THE INVENTION

This invention relates to data transmission systems and more specifically to a multiple telephone line/multiple modem rule based parallel data transmission systems.

The novelty of the invention lies in the integration of existing devices, products and networks along with software and firmware which makes the process of data transmission much more efficient, less costly and less time consuming. By utilizing low cost dial-up telephone lines and data compression techniques inherent in the hardware and software, in concert with rule-based file distribution and segmentation techniques, the cost of each data character transmitted and received is significantly reduced. Furthermore, the speed at which data is transferred is increased by an order of magnitude over that normally available for dial-up service.

In effect, the economic viability of leased line or other dedicated data circuits is greatly diminished while increasing the economic viability of other low cost data communications channels such as dial-up telephone circuits as a cost effective alternative.

BACKGROUND OF THE INVENTION

Multi channel data transfer has been described in patents issued to Giorgio (U.S. Pat. Nos. 4,862,456 and 4,864,567) and to Nash (U.S. Pat. No. 4,577,312). However, these patents either use a central office switch or similar system to obtain simultaneous transmission which requires additional equipment and expense or do not comprise compression of data or multi tasking capabilities thereby limiting the over all throughput of data. Further none of these systems use a rule-based approach to the file management associated with transmission of large amounts of data.

In contrast, the present invention does not suffer from any of these restrictions. The present invention does not require any additional equipment beyond a normal computer with communication channels and modems. Further the present invention employs compression algorithms to further speed the transmission of data and executes in a multi-tasking environment to give further throughput of information. These factors, together with the use of a rule-based system of file management and channel selection renders the current invention extremely fast and easy to use, with a minimum of operator interaction.

Data files are read from the directory of a computer and analyzed as to their data content, format and category (i.e. binary, ASCII text, image format, etc.). Individual files or parts of individual files are then directed to any number of attached modems and their respective dial-up circuits. Data files are received at the remote end, and if segmented, re-appended (reconstructed) and stored on the remote end disk system component of a computer which is also equipped with multiple modems and multiple dial-up circuits. Individual line speeds exceed 60 kbps (6,000 characters per second) while aggregate baud rates (data throughput rates) are only limited by the number of lines and modems available for transmission.

U.S. Pat. No. 4,311,877 to Kahn discloses a method and means for improving the reliability of systems that transmit relatively wideband signals over two or more relatively narrowband transmission circuits. This invention divides the transmission line into separate lines, each carrying a different frequency range component of the overall frequency range carried on the original transmission line. The system also segments input signals according to frequency range, splitting the bandwidth of the original signal into frequency range components for transmission on the transmission lines. All input signals are segmented in the same manner so that they are passed by the matching line, thereby conserving bandwidth for the transmission. The present invention segments data files according to file size, not frequency range, in order to increase the overall throughput of the transmission. The segmentation performed by the present invention is based on rules for efficient transmission, not on a fixed set of frequency ranges.

Failures in a transmission circuit are detected by the Kahn invention. When a failure is found, a switching circuit is activated and the signal on that line is switched to a new line having the same bandwidth. However, only complete failures in the transmission circuit are detected by the Kahn invention. The present invention checks the signal to noise ratio of each transmission channel, switching channels if line degradation occurs.

In the Integrated Services Digital Network (ISDN) embodiment, utilizing 64 KBps or faster channels, individual data rates exceed 300 KBPS while aggregate data throughput is only limited by the number of ISDN circuits (and associated ISDN interfaces) available at both ends of the transmission system.

The system utilizes a novel file naming convention which enables the computer hardware and software to optimize data compression and/or file segmentation in order to achieve maximum data throughput. Destination address (telephone number) data are automatically computed based upon unique data file suffix interpretation.

A user friendly software front-end system is provided to automatically configure the system to the individual requirements of the user.

Data throughput rates are achieved which were hitherto only accomplished utilizing expensive leased data circuits operating at data rates of from 4800 to 56 KBPS or higher or other non-switched dedicated services. The system also facilitates switching of data which is not normally possible when leased lines (i.e., point to point) are utilized.

It is therefore an objective of the present invention to employ an expert system/rule-based approach to data transmission to minimize operator interaction in such data transmission, yet maximize the speed of transmission of data files of any type.

It is another objective of the present invention to provide a cost effective system of data transmission that is similar in performance to more expensive leased lines or dedicated higher capacity data transmission lines but which relies upon the use of low-cost communications channels such as dial-up service.

It is another objective of the present invention to further reduce communications costs by conducting as much file related manipulation as possible off line.

It is yet another objective of the present invention to provide a low cost replacement for more sophisticated and expensive data transmission controllers such as the IBM 3725 or 3705, or similar communications front end systems.

Further it is an objective of the present invention to provide rapid data communication in both foreign and domestic ISDN standard environments.

SUMMARY OF THE INVENTION

The Parallel Rule-Based Data Transmission method and apparatus comprises several major components:

A. Multiple computer systems equipped with communications ports to send and receive data, B. Multiple modems attached to multiple communications ports on each computer system, C. Multiple telephone company dial-up lines or other data transmission media attached to each computer (both sending and receiving units), D. Rule-based data communications software programs providing multi-tasking and multiprogramming capabilities to divide or segment files to facilitate simultaneous transmission and reception of data based upon the number of telephone lines or data transmission channels and modems utilized.

The computer system is a low cost conventional 80286, 386 or 486 microprocessor based PC or other computer or data processor (such as those based on Motorola 68000 or other CPU) having the ability to run the rule-based software that is used for the data transmission management and having an amount of memory sufficient to store the data files to be transmitted. The data processor used must of course also have enough random access memory to store and run the software. It will be readily apparent to those skilled in the art that other computers capable of running rule-based systems which are not based on these same chips are still viable processors for the invention with only slight changes to the software disclosed. The computer further comprises multiple communication ports to facilitate the multi channel simultaneous transmission of data. Each computer system can transmit data to or receive data from any other computer system similarly equipped without regard to distance or individual line conditions. Provisions are made for ISDN compatibility through the automatic distribution of data files or their components to each ISDN B channel connected.

Multiple modems on a single computer are employed to serve as the outgoing telecommunication equipment for simultaneous transmission of segmented (where appropriate) data files. The modems also employ data compression/decompression means to further speed the parallel transmission of data, and to decompress incoming data "on-the-fly" thus further reducing communication time. The invention uses standard run length encoding or Huffman encoding as its data compression scheme for ASCII data and a standard commercially available data compression algorithm known as Comm-Pressor available from Adaptive computer Technologies, Santa Clara, Calif. for binary data. Data are compressed via hardware and software techniques to levels up to or in excess of 6:1 thus elevating data transmission rates on standard telephone lines to in excess of 6,000 characters per second per line utilized. Thus through simultaneous use of multiple data channels the aggregate data transmission rate is only limited by the number of communications channels available.

Multiple dial-up lines are used as the basic transmission medium over which the present invention sends its data. These lines are much less expensive than dedicated leased lines thereby yielding a further financial advantage of users of the present invention. It is important to note however, and it will be readily apparent to those skilled in the art of telecommunications that other transmission media also exist for which the present invention is equally applicable. For example, radio frequency links, satellite data communication, laser communication, fiber optic links and others are all candidate transmission media for use with the present invention. Collectively, these are referred to as transmission media. The transmission channels refer to the transmission media together with the send and receive ports and modems.

The system incorporates several rule-based computer software programs which facilitate data file segmentation, data compression, and reconstruction, as well as error detection and correction and automatic transmission speed control responsive to the condition of each individual transmission channel. As is well known in the art, rule-based systems are run according to "rules" that are loaded into the system software. These rules govern the functions of the system in any given situation. This is accomplished by sensing certain control parameters within the system. The status of these parameters characterizes the status of the system at any point in time and also provides an address to retrieve from the system memory the rule corresponding to that system status. The rule is then utilized by the system software to effect a change in the system based on the current system status. Further rules relating to Least Cost Routing are also employed to further minimize costs. In addition, software provides automatic dialing directories based upon a novel file naming convention, selective adaptive compression based upon data file contents and automatic retry if a line is dropped or intentionally interrupted. If one channel is inordinately noisy, the invention senses the problem automatically, automatically reallocates the data to be transmitted to less noisy channels and all other communications channels will adjust to accept the increased load automatically until the noise level decreases. The communications software currently in use is the Relay Gold Communications software package available from Microcom, Inc. Other such communications packages can also be used as a substitute for Relay Gold.

Table lookup software programs are provided to automatically dial the correct destination telephone number or other equipment address to which data files will be transmitted based upon the naming conventions utilized in each file group to be transmitted. Each group of files may be associated with and targeted for any number of individual telephone numbers or addresses thus providing multiple simultaneous transmission/reception circuits only limited by the number of lines, ports and modems/ISDN circuits available. Each destination site or equipment, as previously stated, has a computer(s) each with multiple modems with separate addresses or telephone numbers. These modems receive the parallel transmission of multiple files or segmented files simultaneously.

File segmentation is the process by which the present invention examines the number of transmission channels available, based upon the number of sending and receiving modems available, and divides the file or files to be sent, more or less evenly among the available channels. Rules exist for the orderly segmentation of files as explained below. The actual segmentation occurs at points in the file where a division of that file naturally occurs (such as a carriage return entry). Alternatively to the extent that addresses on a network are designated in a specific pattern an algorithmic determination of the address can be substituted for the table look-up procedure.

All file segmentation (file division) and file reconstruction processes take place off-line, while the computers are not communicating, thus reducing "connect time" expense. For example, a file of 2,000,000 characters is automatically divided by the number of transmission channels available and each segment is directed to a different channel. Segment prefixes and suffixes are added to the file to denote how the segment relates to one another. At the destination, the data file segments are reassembled to recreate the individual file as it was originally input to the transmission equipment. Reassembly is the act of reading the file segment identifier information (segment prefixes and suffixes) appended to the segments and contained in a special file (known as MAP.DAT) file and using that information together with segment identification information to "piece" the file back together into its original form.

The present invention allows for data to be transmitted in a highly flexible way. Single files may be simultaneously transmitted to multiple locations. Alternatively multiple files may also be transmitted to single or multiple locations simultaneously. This multi-tasking occurs from a single copy of the software. There is no requirement for multiple copies of the software to be running for each transmission session. Data transmission sessions run from a single RAM resident copy of the program. This has the obvious advantage of preserving RAM space for other applications or to allow the transmission process to occur in a speedy fashion.

Once the system has been configured and files loaded, the rule-based software operates automatically to perform the necessary file management and segmentation functions. All such functions are performed without any need for operator intervention. After transmissions are complete, the system automatically terminates its data transmission session and readies itself for the next series of data transfers.

Transmission channel allocation optimization is accomplished by the software system via a series of rules which determine file segmentation. The segmentation is characteristically based on the transmission characteristics of the data file, namely, the number of files to be transmitted, their respective sizes and contents, their compression attributes, and the number of available communication equipment (modems) at both the transmission and destination locations. Optimization software then allocates the optimal number and type of files to each data transmission channel for subsequent transmission according to these data filed characteristics. If one or more of the destination ports is busy or otherwise inoperable, the system redistributes targeted data files automatically to the remaining operable channels (ports) for transmission on a first-in-first out (FIFO) basis. Further, the present invention automatically monitors the transmission channel itself to determine that the channel is operating properly and is not inordinately noisy. If the transmission channel malfunctions, the invention senses this failure, and the software reallocates the data file or segments to be sent to the transmission channels that are functioning properly.

The resident software also provides full reporting capability to the user including file(s) transmitted, destination(s), throughput achieved and associated error detection and correction statistics.

The present invention relies upon several novel file and file suffix naming and interpretation conventions in order to achieve full automation without user intervention. User file naming rules are integrated into a table lookup facility inherent in the software which determines file collating sequences when files are segmented and reassembled. The software sorts files by type, size and structure, looks up and determines, based upon three character (or more) file suffix (alphanumeric) destination telephone numbers or addresses for each group of files to be transmitted. This information is then passed to the operating system software and actual telephone numbers are then loaded into memory and passed to the modem(s) for off hook dialing.

The rule-based software then determines the sizes of files and counts number of files to be sent. If number of available ports exceeds number of files or there is only one file to be transmitted, file segmentation is invoked above a certain threshold size length. File(s) are divided based upon number of complete transmission channels available and segments are marked for reassembly. File segments are then sub-labeled with new prefixes indicating their component serial level and prepared for transmission.

Data compression occurs based upon the type of data being sent (ASCII or binary). The type of data is determined by the system and the data compression peculiar to that type of data is applied by the modem and software as the data is transmitted (as discussed above). Similarly, the destination modem decompresses the data as it is received, first determining via a transmitted identifier, the type of data compression used.

At the destination, file segmentation detected via the presence of a special file known as a MAP.DAT file, segment serial numbers are sorted and files are reassembled subsequent to disk storage at which time file naming conventions are reinvoked. It is important to note that file segmentation and reassembly functions take place off line (on hook) so as to minimize telephone line connect time and its attendant expense.

DETAILED DESCRIPTION OF THE PREFERRED EMBODIMENT

Figure 1:
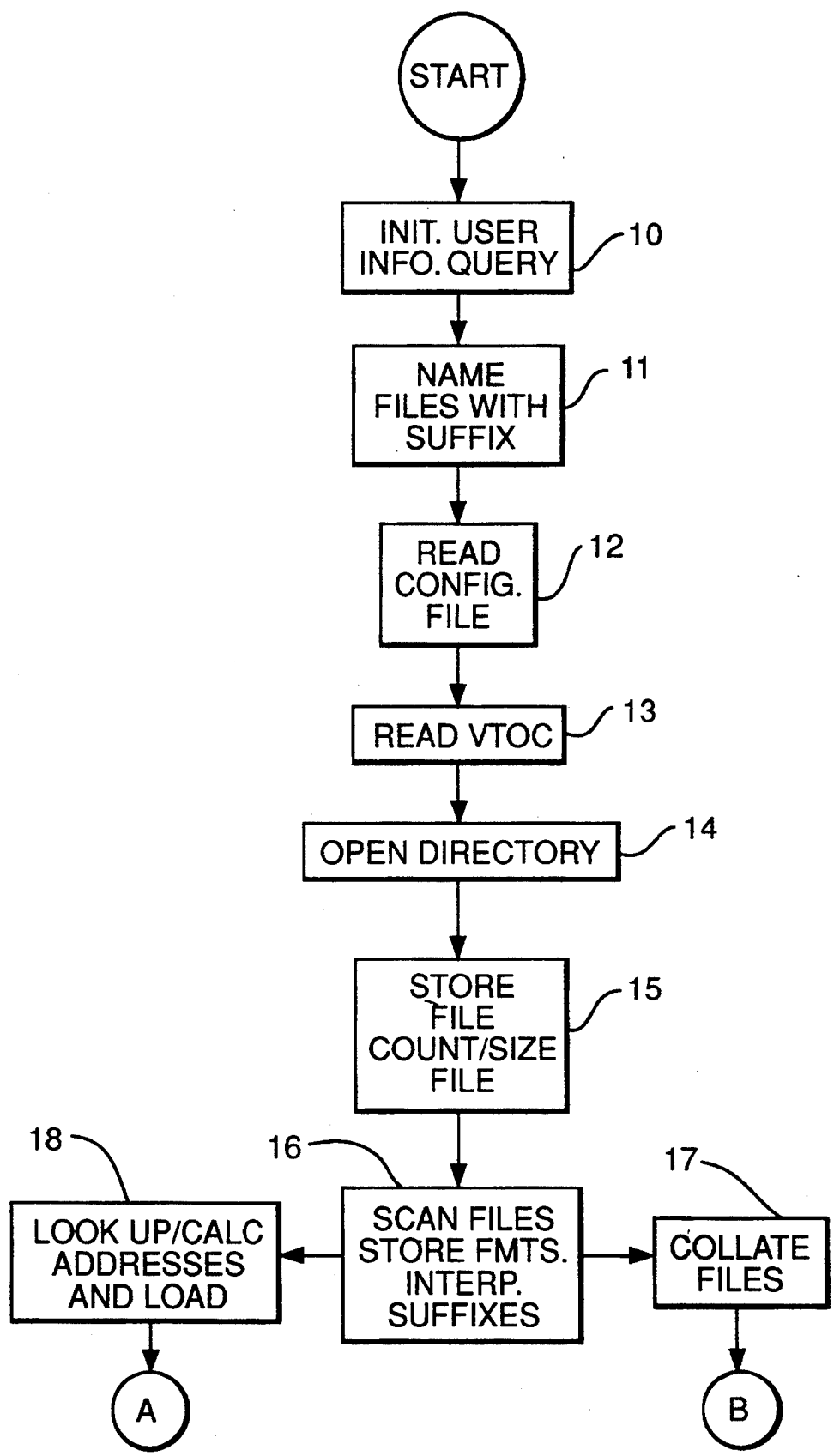
FIG. 1. The Preliminary Data Transmission Flow
Figure 2:
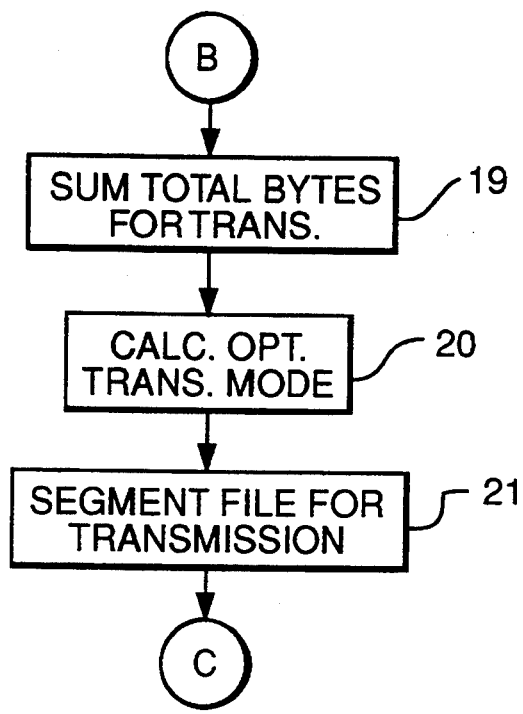
FIG. 2. The Preliminary Data Transmission Flow-Continued
Figure 4:
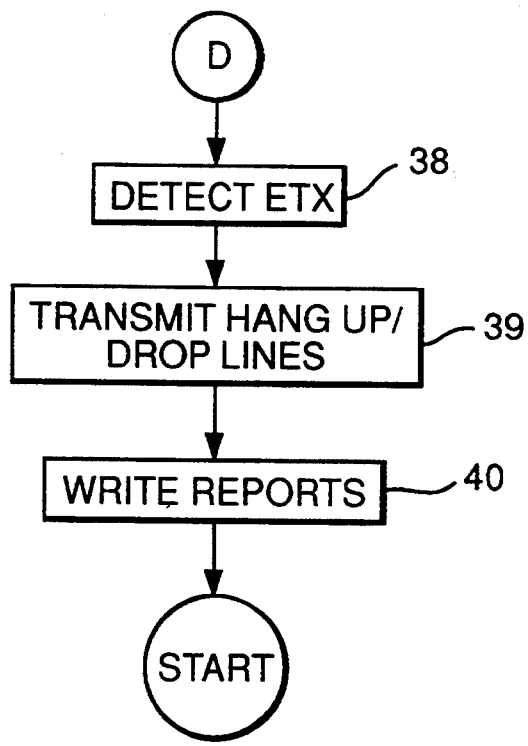
FIG. 4. The Data Transmission and Monitoring Flow-Continued

Referring to FIG. 1, the transmission process is described.

The invention first ascertains the user identity and whether the user will be transmitting or receiving data [10]. If transmitting data, the invention assigns file names to the data to be sent including suffixes which uniquely identify the destination telephone numbers or addresses [11].

The invention next reads the data file presented for transmission. The file is configured for subsequent operations [12]. After configuration the Volume Table of Contents (VTOC) is read [13]. A directory is opened for the storage of the data file(s) to be transmitted [14] and the configured file is stored in the designated directory

[15]. Simultaneously with the storage, the data file characteristics are determined. These include the size and contents of the file, and compression attributes, as well as the number of modems available at the transmission and destination locations.

The files so stored are next scanned and formats are determined for the transmission of the files [16]. In addition, the suffixes to any files are interpreted to determine the destination of the file [16].

Based upon the files scanned and the interpretation of the suffixes, a table lookup file is addressed to determine the telephone number or address of the destination [18]. These telephone numbers are then loaded for the dial-up calls to be made subsequently by the multiple modems [33]. In preparation for the transmission of files, the data files are collated [17] and the total number of bytes to be transmitted are determined [19]. The optimal segmentation of the file for transmission is next calculated [20] (if appropriate) based upon certain segmentation rules. Finally, the file is segmented for subsequent transmission [21].

The file segmentation rules implemented by the rule-based software apply the following criteria:
1. If the number of available complete transmission channels (i.e. a transmission modem with corresponding receiving modem) exceeds the number of files to be sent, segment the files, provided that the files exceed a certain threshold. (In the case of the preferred embodiment the threshold is set at 2 KB. Other thresholds can also be set).
2. If the number of available complete transmission channels does not exceed the number files to be sent and the files are more or less equal (as further explained below) allocate the files evenly over the available transmission channels without segmentation.
3. If the number of available channels is equal to or less than the number of files but the file sizes are disproportionate to one another, then segment to achieve optimum throughput. "Disproportionate" size is determined by examining the Volume Table of Contents to determine the various file sizes. If the largest file is more than twice the size of the next largest file, the largest file will be segmented and allocated to more than one transmission channel.

The invention also incorporates a rule based subsystem, comprising a subset of the segmentation rules to optimize the cost associated with data transfers based upon the types of communications channels available to the user and their respective relative costs per character transmitted. This function is invoked via a least cost routing table, which is the volume of system memory storing the least cost routing rules, which takes into account:
Time of day/day of week tariff charges and discounts.
Distance sensitive (i.e. NPA/NXX/VH) tables which articulate the cost per minute of connection based upon the distance of the individual call or calls.
Anticipated call duration (which is computed based upon total byte count divided by the number of connections available at both ends of the connection.) sensitivity.

The cost optimization algorithm predicts the lowest possible connection cost (i.e. selecting the least expensive lines for each respective communications session) based upon the types and categories of channels available to the user which might include:
standard dial up telephone lines.
PBX dial access trunks.
Tie (dedicated circuit) lines.
Flat cost per minute dial up lines.
Microwave Central Office bypass circuits.
Other Central Office bypass circuits.
Volume discount dial up circuits.
Time of day/day of week discount dial up circuits.

Any combination of these and other channels available to the user at both ends of the communication link can be used for purposes of these calculations.

Provision is made for the updating of all tariff tables in order to assure that current cost data is maintained and properly applied to each communications based file transfer.

Figure 3:
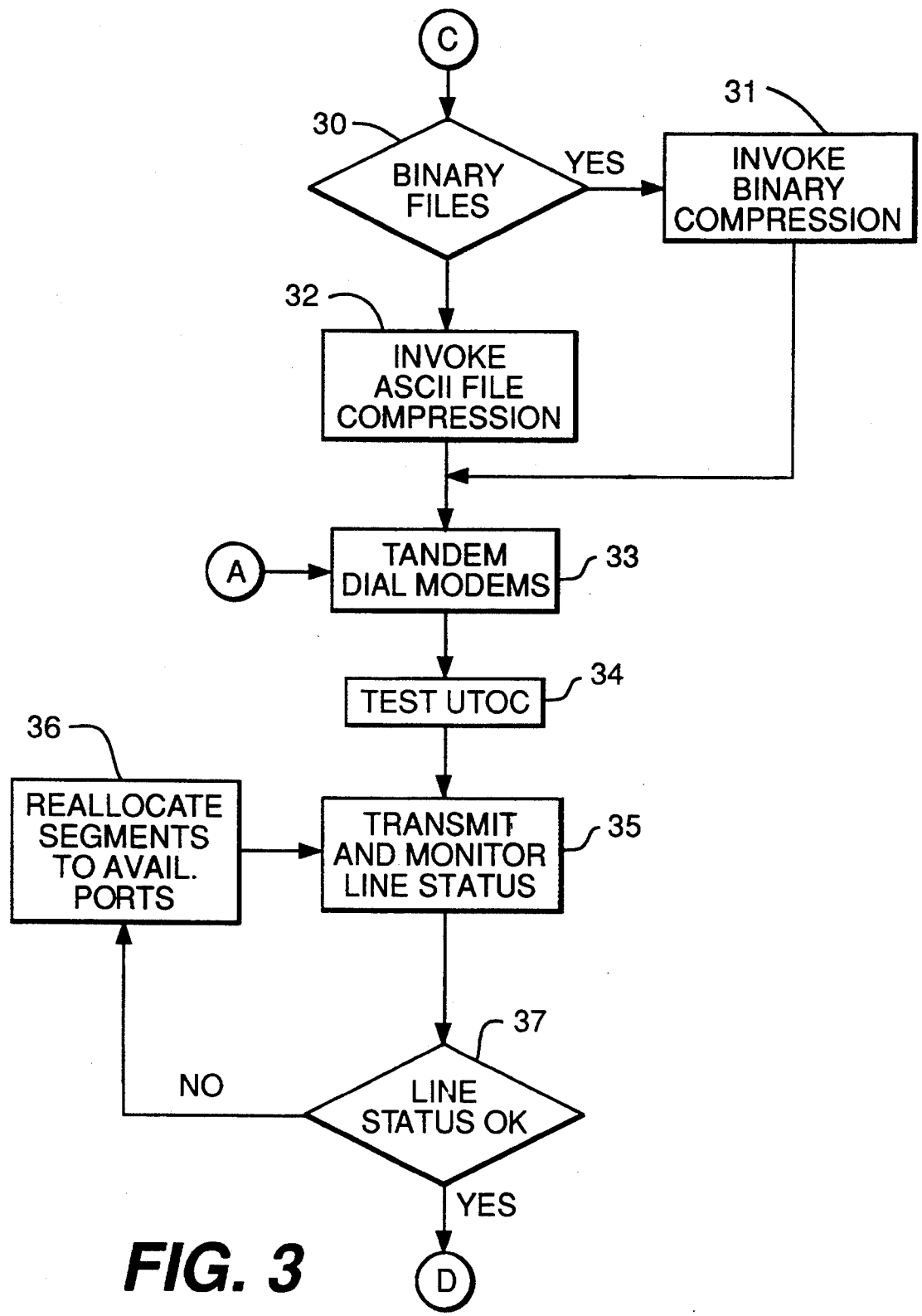
FIG. 3. The Data Transmission and Monitoring Flow

Referring to FIG. 3 the transmission process is further described. The invention next determines if binary files are present (vs ASCII files) [30]. If binary files are present, the invention invokes a binary data compression algorithm [31]. If binary files are not present an ASCII file compression algorithm is invoked [32]. Once the file segmentation is accomplished, the multiple modems of the invention are dialed [33] based upon the telephone numbers or channel addresses loaded from the lookup table [18].

The VTOC of the receiving computer is tested [34] to determine if appropriate space is available to receive all of the files about to be transmitted. If insufficient space is available the transmission session is terminated and an error message is displayed at the transmitting system. If sufficient space is available, the files are subsequently transmitted over the multiple modems [35]. Transmission channel quality and status are continuously monitored during the course of transmission [35]. If line quality remains adequate transmission continues [37]. If line quality falls below minimum standards of signal-to-noise ratio the remaining untransmitted segments are reallocated to those transmission channels that are functioning properly [36] and transmitted on a FIFO basis. At the end of the transmission the system detects the end of transmission (ETX) [38] signal, and transmits a hang up tone and terminates the transmission over the various telephone lines [39]. At this point the invention is off-line. The invention next writes reports [40] that include segment size, transmission time, errors encountered and aggregate throughput and the system returns to the start point ready for the next transmission.

Figure 5:
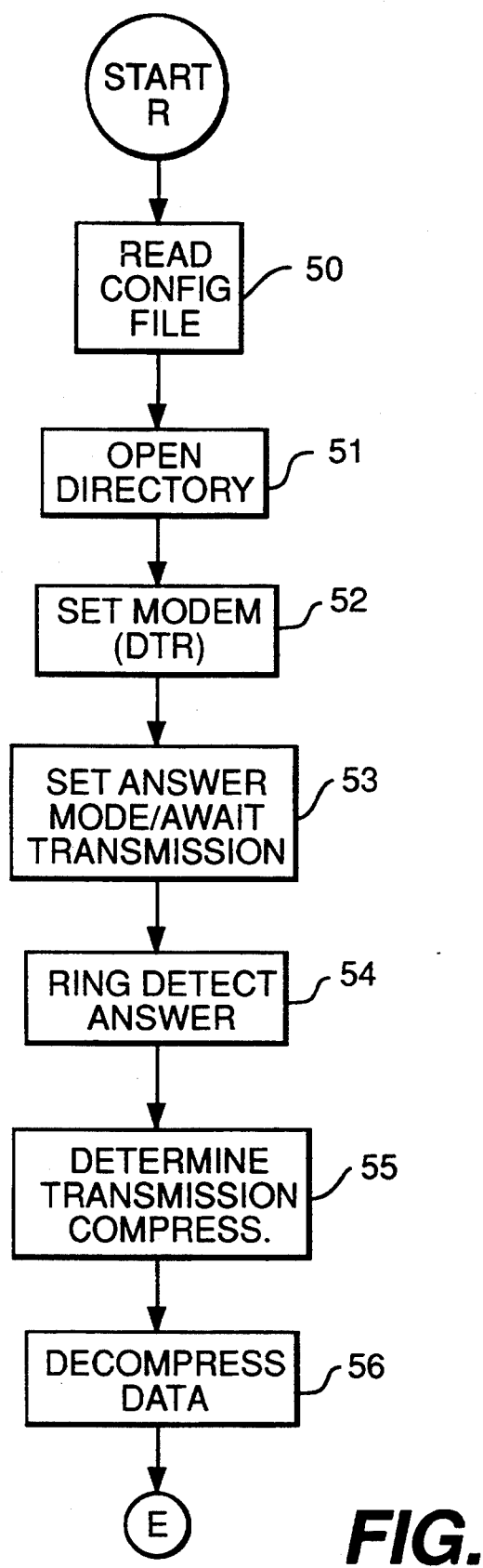
FIG. 5. Data Receiving Flow

Referring to FIG. 5, the receive and decompression function is described. The receiving system is first configured to accept files that will be transmitted to it [50]. A directory is opened to receive the incoming data [51] and the multiple modems are set and Data Terminal Ready (DTR) is established [52]. The answer mode is set on the modems and the system awaits the transmission of data [53]. When transmission begins the incoming ring is detected and the modems answer the incoming calls [54]. Based upon incoming information, the compression scheme of the incoming data is determined [55]. The data is decompressed [56] in accordance with the appropriate decompression algorithm.

Figure 6:
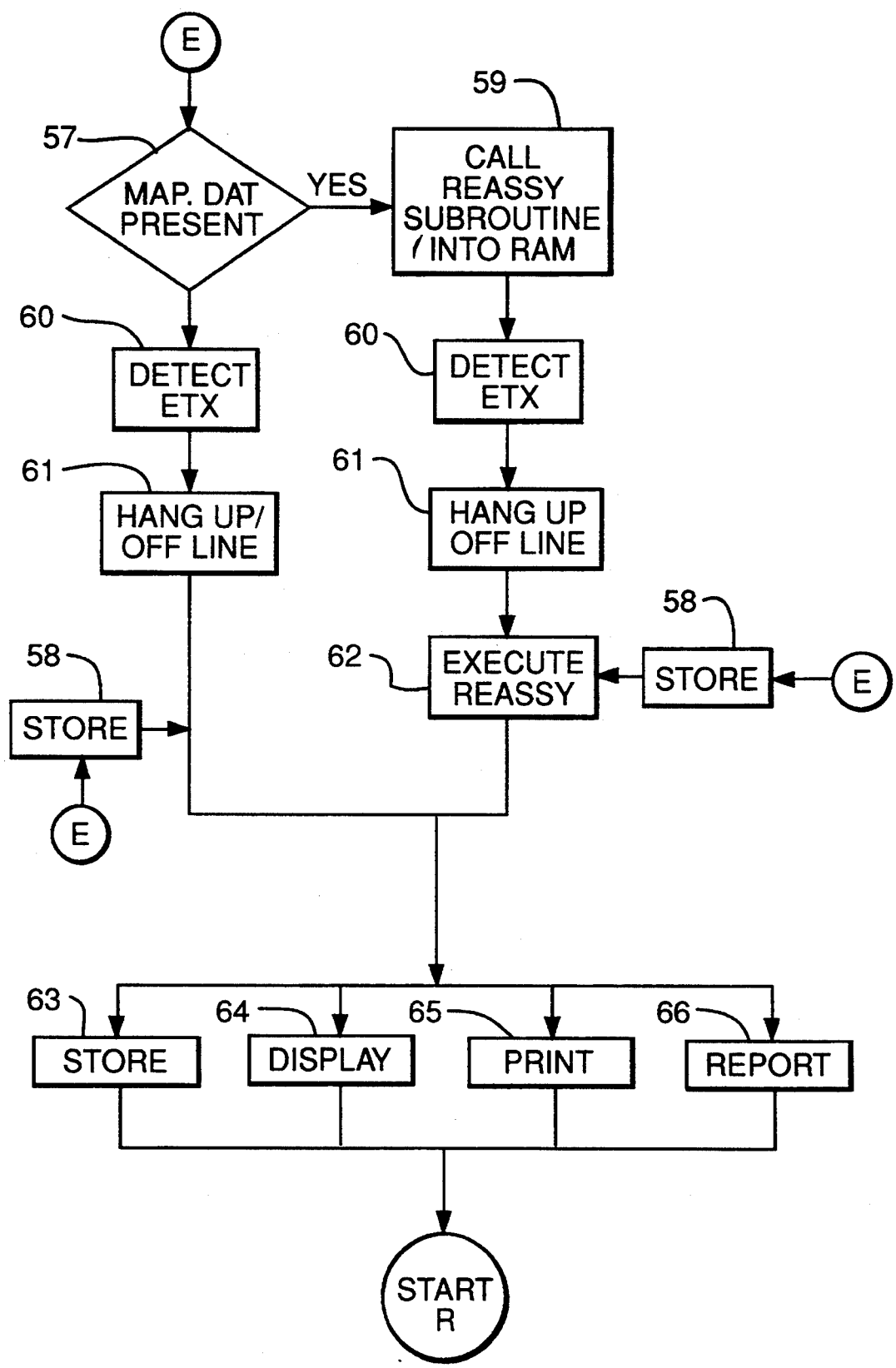
FIG. 6. Incoming Data file or File Segment Processing.

Referring to FIG. 6 the receive and decompression process is further described. After the data is decompressed the invention determines if file segmentation has occurred. This is accomplished by determining if segment file entitled MAP.DAT exists [57]. The MAP.-DAT file is a file that comprises instructions for how a file has been segmented and is the primary input to the file reassembly subroutine to allow the segmented file to be reassembled. If the MAP.DAT file exists, the reassembly subroutine is called and loaded into RAM [59] together with the data from the MAP.DAT file. At the same time that segmentation is being detected, the decompressed data is stored for subsequent operations [58]. The invention next continuously monitors incoming data for the "end of transmission" (ETX) signal [60]. Once this signal is sensed, the system goes off-line [61] and processing continues. For those files that were segmented for data transmission, the invention reads the file collating information in the MAP.DAT file and reassembles the segments and stores them [58] into the original file format [62].

If the MAP.DAT file is not detected [57] the invention detects the end of transmission signal [60] and goes off line [61]. Non-segmented data can then be recalled from storage [58] for subsequent display [64] storage [63], printing [65] and/or report writing [66]. The system is thereafter returned to the starting point for receipt of the next data file.

An important aspect of the invention is the file naming convention mentioned above. A three (or more) character file suffix is utilized which is equivalent to the "target" destination address (i.e., telephone number) to which the file is to be transmitted. Valid entries are any combination of alphanumerics (i.e., a–z, 000–999), which are then related to a table which specifies from one to any number of target telephone numbers to be utilized for file transfers.

File name identifiers (prefixes) are composed of eight or more alphanumeric characters which correspond to the individual user's internal file naming conventions. The latter forms the basis for the resulting file collating sequence. An example might be a series of image files for a medical diagnostic procedure where the first five characters are the x-ray number of the patient, followed by the image number where:

R12345001 is the file name.
R12345 is the x-ray number.
001 is the image number for that patient.

Thus, files conforming to this format would be directed as follows:

R12345001.xxx, R12345002.xxx, R12345003.xxx

All of the above file names contain the suffix xxx. The table entry identifies that suffix as telephone numbers 1–n and those numbers are loaded for subsequent dialing. Files are sorted by prefix and loaded for transmission and are received at the remote location in the collated order. In the event that the user requires file transfers between minicomputers and mainframes, the invention also provides terminal emulation capability for the IBM 3270 and 3101, the DEC VT100, 220 and 240 and Telex and TTY modes as well as other terminal emulations and transmission protocols. Terminal emulation programs are well known and widely commercially available. They are basically translation programs which allow data that are entered on a particular terminal or computer to be adapted for communication with and use by another type of terminal or computer, or to allow data communication over a communication channel that is not normally adapted for use with the sending and/or receiving terminal or computer. Thus, communication among the listed terminals, personal computers (PCs), and mainframes, as well as others, is possible using the software resident in the data processor utilized by the system of the present invention.

While the embodiment just described may employ single byte (such as the 8250 chip) communications buffers another embodiment employs multiple byte communications buffering (such as the 16550AH FIFO interrupt driven buffer.) Yet another embodiment eliminates the serial port/UART (universal asynchronous receiver/transmitter) combination completely and substitutes the parallel computer port as the communications interface medium. The latter embodiment provides data transfers at rates exceeding four times that of a standard serial port modem connection.

While the source code to be executed may reside on the computer's disk drive for loading into its random access memory, it may also reside in EPROMS as an electronic disk. The latter embodiment provides greater speed of execution, enhanced security from tampering and greater ease of installation.

On the following pages, the software of the preferred embodiment is presented. It will be apparent from certain of the annotations that this software is adapted to a medical application, specifically that of transmitting image files between locations. However, it will be apparent to those skilled in the art that the present invention can be utilized to transmit all manner of data files and is not limited by the application presented. Thus it will be apparent to those skilled in the art that new applications for the invention may be devised without departure from the spirit and scope of the invention as claimed.

```
* SCRIPT: CONFIG. SCR
*
* FUNCTION: Front-end interface to CONFIG.DAT on error
        clear

* Subordinate phy's support on ?
        global &HIER
        if (&1 = HIER) then &HIER = Y
        else &HIER = N

* Get script application drive
        &APPLDR = &option(SDRIVE)

* Make sure path is suffixed with a backslash
        if (&substr(&APPLDR, &length(&APPLDR), 1) <> '\') then
&APPLDR = "&APPLDR\"
```

```
        &MESSAGE2 = "TAB-Next Field   ENTER-Done  F1-Phy/Tel Maint
ESC-Abort   F10-Help"
        &MESSAGE1 = ""
        &PATHSPEC = ""
        &SPEEDCHK = "50, 75, 110, 135, 150, 300, 450, 600, 1200,
1800, 2000, 2400, 3600, 4800, 7200, 9600, 14400, 19200, 38400,"
        &PORTCHK = "COM1, COM2, COM3, COM4, COM5, COM6, COM7, COM8,
HOSTS, IBMSHARE, NONE, IRMA, IBM, FORTE, IBMLDFT, IBMSDFT, SPECIAL,
NPCSHARE, NACSHARE, USER1, USER2, COM3PC, COM4PC, GATEWAY,"
        &MODCHK = "T, CD, 9, H, S, HV, PC, AX, QX, MT, C, P, V, W,
X, R, B, BI, E, US, O, I, M, A, D, HC,"
        &FIRSTSUB = Y

* If configuration file exists, then continue
        if exists &APPLDR.CONFIG.DAT then goto CONT1

* Otherwise, init all vars in panel to blanks
        gosub INITBL 1
        goto CONT3

-CONT1
* Open configuration file
        open &APPLDR.CONFIG.DAT as #1 for input
        &hrc = &RC
        if (&hrc <> 0) then read line &Q1 "qCould not open file
&APPLDR.CONFIG.DAT.  Process aborted.  Press ENTER."
        then stop

* loop to read all records
        &RECCNT = 0
        &ELEM = 1
        loop READREC *
           read file #1 &RECSTR          ;* read a record
           if not found then goto CONT2  ;* if EOF then jump out &RECCNT = &RECCNT + 1 ;* increment record counter

* If 1st record being processed, then assign to path-specification
           if (&RECCNT = 1) then &PATHSPEC = &trim(&RECSTR)
           then goto READREC argstring &RECSTR     ;* break-out tokens
           parse "~" ...         ;* use tilde as delimeter

* Check for illegal # of tokens
           if (&N <> 6) then read line &Q1 "qIllegal # of tokens in
record &ELEM - Record ignored. Press ENTER."
                                                              t  h  e  n
&ENT&ELEM="";&NUM&ELEM="";&SPEED&ELEM="";&PTYPE&ELEM="";&MTYPE&EL
EM="";&NAME&ELEM=""

* Otherwise, assign token from record to panel vars
           else &ENT&ELEM=&trim(&1)
           else &NUM&ELEM=&trim(&2)
           else &SPEED&ELEM=&trim(&3)
           else &PTYPE&ELEM=&trim(&4)
           else &MTYPE&ELEM=&trim(&5)
           else &NAME&ELEM=&trim(&6)
           &ELEM = &ELEM + 1
-READREC -CONT2
* Clear all remaining panel vars
        gosub INITBL &ELEM
        close #1
```

```
-CONT3
        display panel CONFIG

-CONT4
        display input &RESPONSE
        if (&RESPONSE <> ESCAPE) and (&RESPONSE <> ENTER) and
(&RESPONSE <> F10) and (&RESPONSE <> F1)
        then smsg "qInvalid response ..."
        then goto CONT4 if (&RESPONSE = ESCAPE) then smsg "qModifications not saved
... Exiting to DOS."
        then wait 3
        then stop if (&RESPONSE = F10) then gosub HELP1
        then goto CONT4 if (&RESPONSE <> F1) then goto CONT56

* Assumed tel maint ops
        gosub SAVEDATA F1
        &HRC = &rc

* Errors in COMM SCREEN ?
        if (&HRC = 1) then goto CONT4

* If 1st time request for tel maint then init
        if (&.FLAG1 = &FLAG1) then &FLAG1 = Y
        then &PG = 0
        then &DPG = 1
        then smsg "qOne moment please ..."
        then gosub READTEL
        smsg "q "
        &CURUPD = N
-DISPAG
        display panel CONFIGT0.PNL

* Place cursor on particular field ?
        if (&CURUPD = Y) then display cursor &LASTFLD
-CONT99
        &MESSAGE1 = ""
        if (&HIER = Y) then &STUFF = "F2-Subordinate Physician's
"
        else &STUFF = ""
        if (&PG = 0) then &MESSAGE1 = "TAB-Next Field    ENTER-Done
    PGDN-Next Page    F1-Comm Maint"
        then &MESSAGE2 = "&STUFF ESC-Abort    F10-Help"
        if (&PG = 9) then &MESSAGE1 = "TAB-Next Field    ENTER-Done
    PGUP-Previous Page    F1-Comm Maint"
        then &MESSAGE2 = "&STUFF ESC-Abort    F10-Help"
        if (&PG >= 1) and (&PG <= 8) then &MESSAGE1 = "TAB-Next
Field    ENTER-Done    PGDN-Next Page    PGUP-Previous Page"
        then &MESSAGE2 = "&STUFF    F1-Comm Maint    ESC-Abort
F10-Help"
        display output
        display input &RESPONSE

* Valid responses
        if (&RESPONSE <> ESCAPE) and (&RESPONSE <> ENTER) and
(&RESPONSE <> F10) and (&RESPONSE <> F1) and (&RESPONSE <> F2) and
(&RESPONSE <> PGDN) and (&RESPONSE <> PGUP) and (&HIER = Y)
        then smsg "qInvalid response ..."
        then goto CONT99 if (&RESPONSE <> ESCAPE) and (&RESPONSE <> ENTER) and
```

```
(&RESPONSE <> F10) and (&RESPONSE <> F1) and (&RESPONSE <> PGDN)
and (&RESPONSE <> PGUP) and (&HIER = N)
        then smsg "qInvalid response ..."
        then goto CONT99

* Check for pages 1 and 10 for Page Up and Page Down limits
        if (&RESPONSE = PGUP) and (&PG = 0) then smsg "qNo more
previous pages ..."
        then goto CONT99
        if (&RESPONSE = PGDN) and (&PG = 9) then smsg "qNo more
pages available ..."
        then goto CONT99 if (&RESPONSE <> F10) then goto CONT23

*.HELP ops.
        display save
        if (&HIER = Y) then display panel CONFIGHT
        else display panel CONFIGHX -USERINP2
        display input &RESPONSE
        if (&RESPONSE <> ESCAPE) then goto USERINP2
        display restore
        goto CONT99

-CONT23
* ESCAPE ops.
        if (&RESPONSE = ESCAPE) then smsg "qModifications not saved
... Exiting to DOS."
        then wait 3
        then stop

* F1 ops.; jump back to comm maint
        if (&RESPONSE = F1) then &MESSAGE2 = "TAB-Next Field
ENTER-Done  F1-Phy/Tel Maint  ESC-Abort   F10-Help"
        then &MESSAGE1 = ""
        then goto CONT3

* F2 ops. (subordinate phy's)
        &CURUPD = N
        if (&RESPONSE = F2)
        then gosub DOSUBORD
        then &CURUPD = Y
        then goto DISPAG if (&RESPONSE <> ENTER) then goto CONT34

* ENTER ops.
        gosub SAVEDATA
        &hrc = &RC

* If any invalid data in comm maint screen, then show user
        if (&hrc = 1) then goto CONT3
-CONT34

* For page up/down increment/decrement page counters
        if (&RESPONSE = PGUP) then &PG = &PG - 1
        then &DPG = &DPG - 1
        then goto CONT99
        if (&RESPONSE = PGDN) then &PG = &PG + 1
        then &DPG = &DPG + 1
        then goto CONT99
        smsg "qInvalid response ..."
        goto CONT99
```

```
* TEL MAIN OPS
* User pressed ENTER
-CONT56
        gosub SAVEDATA
        &hrc = &RC
        if (&hrc = 1) then goto CONT4

* Subroutine to read TEL.DAT file into ram vars
-READTEL

* If TEL.DAT file doesn't exists, then initialize panel vars in 1st
screen
        if not exists &APPLDR.TEL.DAT then gosub INITPG
        then return
        open &APPLDR.TEL.DAT as #1 for input
        &TELREC = 0
        loop TEL1 *
           read file #1 &RECSTR
           if not found then goto CONT78           ;* EOF ?
           argstring &RECSTR
           parse "~" ...
           if (&N <> 2) then goto TEL1             ;* if not 2 tokens
then invalid
           &TELREC = &TELREC + 1
           &P&TELREC = &1                          ;* assign physician
           &T&TELREC = &2                          ;* assign tel. #
-TEL1
-CONT78
        close #1
        gosub INITPG    ;* init unused fields to null
        return

* Subroutine to init vars in panel
-INITPG
* NOTE: 57 phy's per screen X 10 screens
        &XCNT = 1
        loop DOINIT 570

* If var is not initialized yet, then set to null
        if (&.P&XCNT = &P&XCNT) then &P&XCNT = ""
        if (&.T&XCNT = &T&XCNT) then &T&XCNT = ""
        &XCNT = &XCNT + 1
-DOINIT
        return

* Subroutine to init vars in panel
-INITBL
        &PARM1 = &1
        &CNT = &1
        loop INITA while (&CNT <= 8)

&ENT&CNT="";&NUM&CNT="";&SPEED&CNT="";&PTYPE&CNT="";&MTYPE&CNT=""
;&NAME&CNT=""
        &CNT = &CNT + 1
-INITA
        return

* Subroutine to save panel data
-SAVEDATA
        &PARM1 = &1

* Make sure receive path is valid
        &PATHSPEC = &trim(&PATHSPEC)
        if (&substr(&PATHSPEC, &length(&PATHSPEC), 1) <> '\') then
```

```
&HSPEC = "&PATHSPEC\*.*"
        else &HSPEC = "&PATHSPEC*.*"
        if (&fvalid(&HSPEC) = YES) then goto CONT5
        smsg "qRECEIVE PATH invalid."
        display cursor 1
        return 1

* Validate each entry
-CONT5
        &CNT = 1
        loop VALIDATE 8
          &ENT&CNT = &trim(&ENT&CNT)

* If entry name is null, then get next record
        if (&ENT&CNT = "") then goto INCR

* Validate port #
        &NUM&CNT = &trim(&NUM&CNT)
        if (&NUM&CNT > 0) and (&NUM&CNT < 16) then goto CONT6
        if (&NUM&CNT = "ANY") or (&NUM&CNT = "SHR") then goto
CONT6
        smsg "qInvalid PORT # for Entry Name &ENT&CNT"
        substitute display cursor &calc(&CNT - 1 * 6 + 3)
        return 1

-CONT6
* Validate modem speed
        &SPEED&CNT = &trim(&SPEED&CNT)
        if (&instr("&SPEEDCHK","&SPEED&CNT,") > 0) then goto
CONT7
        smsg "qInvalid MODEM SPEED for Entry Name &ENT&CNT"
        substitute display cursor &calc(&CNT - 1 * 6 + 4)
        return 1

-CONT7
* Validate Port Type
        &PTYPE&CNT = &trim(&PTYPE&CNT)
        if (&instr("&PORTCHK","&PTYPE&CNT,") > 0) then goto CONT8
        smsg "qInvalid PORT TYPE for Entry Name &ENT&CNT"
        substitute display cursor &calc(&CNT - 1 * 6 + 5)
        return 1

-CONT8
* Validate Modem Type
        &MTYPE&CNT = &trim(&MTYPE&CNT)
        if (&instr("&MODCHK","&MTYPE&CNT,") > 0) then goto CONT9
        smsg "qInvalid MODEM TYPE for Entry Name &ENT&CNT"
        substitute display cursor &calc(&CNT - 1 * 6 + 6)
        return 1

-CONT9
* Validate Modem Name/Class
        &NAME&CNT = &trim(&NAME&CNT)
        if ("&PTYPE&CNT" = "HOSTS") then goto CHECKHST
        else goto INCR

* Since PORT TYPE is HOSTS, make sure MODEM NAME/CLASS has 3 tokens
separted by
* a blank
-CHECKHST
        if (&NAME&CNT = "") then &FLAGNG = Y
        else &FLAGNG = N
        else argstring &NAME&CNT
        else parse " " ...
```

```
          if (&N <> 3) or (&FLAGNG = Y) then smsg "qInvalid format
for MODEM NAME/CLASS for Entry Name &ENT&CNT"
          then substitute display cursor &calc(&CNT - 1 * 6 + 7)
          then return 1

-CONT10

-INCR
          &CNT = &CNT + 1
-VALIDATE
        smsg "qUpdating configuration files ... one moment please"

* If only validation required, then return
        if (&PARM1 = "F1") then return 0

* All fields were valid.  Write records to configuration file.
        open &APPLDR.CONFIG.DAT as #1 for output
        &hrc = &RC
        if (&hrc <> 0) then read line &Q1 "qCould not open file
&APPLDR.CONFIG.DAT.  Process aborted.  Press ENTER."
        then stop
        write file #1 "&PATHSPEC"

&CNT = 1
        loop WRITE1 8

* If Entry Name is blank, then don't write this record
        if (&ENT&CNT = "") then goto NEXTREC
                         w r i t e     f i l e     # 1
"&ENT&CNT~&NUM&CNT~&SPEED&CNT~&PTYPE&CNT~&MTYPE&CNT~&NAME&CNT"
-NEXTREC
          &CNT = &CNT + 1
-WRITE1
        close #1

* If tel # panel never accessed, then skip write
        if (&.P1 = &P1) then goto DONE2
* Sort physician/telephone arrays
        sortarray &P 570 ORDER &T
        open &APPLDR.TEL.DAT as #1 for output
        &CNT = 1
        loop WRITE2 570
          if (&trim(&P&CNT) = "") or (&trim(&T&CNT) = "") then goto
INCR3
          write file #1 "&left(&trim(&P&CNT),3)~&trim(&T&CNT)"
-INCR3
          &CNT = &CNT + 1
-WRITE2
        close #1
-DONE2
* If subordinate phy screen never accessed, then skip write
        if (&FIRSTSUB = Y) then goto DONE3
        sortarray &M &HTOT
        open &APPLDR.HIER.DAT as #1 for output
        &CNT = 1
        loop WRITESUB &HTOT
          if (&trim(&M&CNT) = "") then goto WRITESUB
          write file #1 "&M&CNT"
-WRITESUB  &CNT = &CNT + 1
-DONE3
        smsg "qUpdate to configuration files complete..."
        wait 2
        stop

* Help routine
-HELP1
```

```
* Make sure user's cursor is on an input field
        if (&substr(&SFIELD,1,1) = "T") or (&substr(&SFIELD,1,1)
= "O") or (&substr(&SFIELD,1,1) = "O")
        then smsg "qWhen selecting help, make sure cursor is on an
input field."
        then return
        &FLD = &substr(&SFIELD,2)        ;* get input field number
        display save                     ;* save video

* Help for receive file
        if (&FLD = 1) then display panel CONFIGH1
        then goto USERINP
        if ((&FLD \ 6) = 0) then &FLD = 5
        else &FLD = &FLD \ 6 - 1

* Help for entry name
        if (&FLD = "1") then display panel CONFIGH2
        then goto USERINP

* Help for port number
        if (&FLD = "2") then display panel CONFIGH3
        then goto USERINP

* Help for modem speed
        if (&FLD = "3") then display panel CONFIGH4
        then goto USERINP

* Help for port type
        if (&FLD <> "4") then goto CONT11

-CONT12
        display panel CONFIGH5
-CONT13
        display input &RESPONSE
        if (&RESPONSE = ESCAPE) then display restore
        then return
        if (&RESPONSE <> PGDN) then goto CONT13
        display panel CONFIGH6

-CONT14
        display input &RESPONSE
        if (&RESPONSE = ESCAPE) then display restore
        then return
        if (&RESPONSE <> PGUP) then goto CONT14
        goto CONT12

* Help for modem type
-CONT11
        if (&FLD <> "5") then goto CONT15
-CONT16
        display panel CONFIGH7
-CONT17
        display input &RESPONSE
        if (&RESPONSE = ESCAPE) then display restore
        then return
        if (&RESPONSE <> PGDN) then goto CONT17
        display panel CONFIGH8

-CONT18
        display input &RESPONSE
        if (&RESPONSE = ESCAPE) then display restore
        then return
        if (&RESPONSE <> PGUP) then goto CONT18
        goto CONT16
```

```
-CONT15
* Help for modem name or class
        if (&FLD <> "0") then goto USERINP
-CONT19
        display panel CONFIGH9
-CONT20
        display input &RESPONSE
        if (&RESPONSE = ESCAPE) then display restore
        then return
        if (&RESPONSE <> PGDN) then goto CONT20
        display panel CONFIGHA -CONT21
        display input &RESPONSE
        if (&RESPONSE = ESCAPE) then display restore
        then return
        if (&RESPONSE <> PGUP) then goto CONT21
        goto CONT19

* Wait until user presses escape
-USERINP
        display input &RESPONSE
        if (&RESPONSE <> ESCAPE) then goto USERINP
        else display restore
        else return

* Subroutine for subordinate phy ops.
-DOSUBORD

* Make sure user's cursor is on an input field
        if (&substr(&SFIELD,1,1) = "T") or (&substr(&SFIELD,1,1)
= "O") or (&substr(&SFIELD,1,1) = "0")
        then smsg "qWhen selecting F2, make sure cursor is on an
input field."
        then return

* Get index to array &P
        &FPOS = &substr(&SFIELD,2)/2
        &RPOS = &substr(&SFIELD,2)\2
        &LASTFLD = &substr(&SFIELD,2)
        &FPOS = &PG * 57 + &FPOS + &RPOS

* Make sure physician specified in input field
        if (&trim(&P&FPOS) = "") then smsg "qNo physician specified
in input field."
        then return

* If 1st time in subord. ops. then read HIER.DAT into RAM
        if (&FIRSTSUB = N) then goto CONT67
        &FIRSTSUB = N            ;* set 1st time flag to NO
        &HTOT = 0
        if not exists &APPLDR.HIER.DAT then goto CONT67
        open &APPLDR.HIER.DAT as #1 for input
        loop READHIER *
          read file #1 &RECSTR
          if not found then goto OUT1
          &HTOT = &HTOT + 1
          &M&HTOT = &RECSTR
-READHIER
-OUT1
        close #1
-CONT67
```

```
* Find match for current physician against master phy in HIER.DAT
        &HCNT = 1
        loop CHECKHR &HTOT
           if (&P&FPOS = &substr(&M&HCNT,1,3)) then goto CONT91
           &HCNT = &HCNT + 1
-CHECKHR
* No match
        &XXC = 1
        &HCNT = END         ;* flag for new element in array &M
        goto CONT92
-CONT91
* Break out subordinate phy's into vars for panel
        argstring &M&HCNT
        parse "~" ...

* If only master phy specified, then skip subordinate process
        &XC = 2             ;* start at 2nd parm
        if (&N = 1) then &XXC = 1; then goto CONT92
        loop DUMPSUB &calc(&N - 1)
           &XXC = &XC - 1
           &S&XXC = &&XC                    ;* assign sub phy
           &XC = &XC + 1
-DUMPSUB
        &XXC = &XXC + 1

-CONT92
* Clear all unused panels fields
        loop CLEARALL while (&XXC <= 18)
           &S&XXC = ""
           &XXC = &XXC + 1
-CLEARALL
        &MESSAGE3 = ""
        &MESSAGE4 = "TAB-Next Field   F2-Phy/Tel Maint    F10-Help"
        &MESSAGE5 = "&P&FPOS"     ;* assign master phy to panel var
        display panel CONFIGT1.PNL overlay
-CONT40
        display input &RESP
        if (&RESP <> F2) and (&RESP <> F10) then smsg "qinvalid
response ..."
        then goto CONT40

*:Back to tel maint screen ?
        if (&RESP = F2) then gosub SAVESUB
        then return
        if (&RESP <> F10) then goto CONT40

* HELP ops.
        display save
        display panel CONFIGHS

-USERINP3
        display input &RESP
        if (&RESP <> ESCAPE) then goto USERINP3
        display restore
        goto CONT40

* Subroutine to save subordinate phy panel variables to a ram array
-SAVESUB

* Construct new string in HIER.DAT format
* If flag to append to end of array &M, then increment array
counter
*.NOTE: &HTOT represents # elements in array &M
        if (&HCNT = END) then &HTOT = &HTOT + 1
        then &INDEX = &HTOT
```

```
* Otherwise use current index to array &M
        else &INDEX = &HCNT

&XXC = 1
        &M&INDEX = "&left(&trim(&P&FPOS),3,' ')~"      ;* assign
master phy
        loop CONS1 18
          if (&trim(&S&XXC) = "") then goto INCR2
          &S&XXC = "&left(&trim(&S&XXC),3,' ')"
          &M&INDEX = "&M&INDEX..&S&XXC.~"       ;* append subordinate
phy
-INCR2
        &XXC = &XXC + 1
-CONS1
        return

* Script: DIAG.SCR
*
* Function: Main driving script for Diagnostic PC

* Globalize vars
        on error

* Debug on ?
        if (&1 = "DEBUG") then define &DEBUG = "Y"
        then strace newlog
        else define &DEBUG = "N"

* Subordinate phy's support on ?
        global &HIER
        if (&1 = HIER) or (&2 = HIER) then &HIER = Y
        else &HIER = N

* If sequence log file exists, then erase it
        if exists logseq then quiet erase logseq

* Provide mechanism to allow user to abort via function key F10
        global &GETOUT
        &GETOUT = N
        on attnkey F10 &GETOUT = Y clear
        smsg "qInitialization in progress ... one moment please."

global &APPLDR                  ;* application drive
        global &NUMPORTS                ;* # of avail. ports on PC global &NUMTEL                  ;* # of telephone #s
        global &NUMPHY                  ;* # of physicians to call
(PC's to call)
        global &RUNREL
        global &TOTMAST                 ;* tot # of master phy's global &ABORT                   ;* editor abort flag
        &TOTFILES = 0

* Get script application drive
        &APPLDR = &option(SDRIVE)

* Make sure path is suffixed with a backslash
        if (&substr(&APPLDR, &length(&APPLDR), 1) <> '\') then
&APPLDR = "&APPLDR\"

* Sort telephone # file (TEL.DAT) by physicians initials (MAJOR)
to tel # (MINOR)
```

```
        if not exists &APPLDR.TEL.DAT then clear
        then read line &Q1 "q&APPLDR.TEL.DAT does not exists.
Application cannot continue. Press ENTER."
        then quiet stop all
        edit &APPLDR.TEL.DAT ex SORTTEL.EDS NODISPLAY

* Read configuration and telephone files into RAM vars
        ex READCONF

* Make sure there are files needed to be transferred
        if not exists &OUTDIR.*.* then clear
        then smsg "qThere are no outstanding files in directory
&OUTDIR"
        then read line &Q1 "qthat need to be transferred.  Press
ENTER."
        then quiet stop all

* Make sure temp directory exists as subdirectory to outgoing
directory
        quiet mkdir &OUTDIR.TEMP

* Check if user pressed F10 to abort
        if (&GETOUT = Y) then goto ALLDONE2

* Start multiple sessions
        ex STARTSES
        &HRC = &retcode

* If any failures on sessions, then stop script and exit relay
        if (&HRC = 1) then quiet stop all

* Check if user pressed F10 to abort
        if (&GETOUT = Y) then goto ALLDONE2 smsg "qSession start successful..."

* If no subordinate phy's support
        if (&HIER = N) then goto CONT91

* Load master/subordinate phy's hierchical structure into ram and
store the
* total number of master phy's
        if exists &APPLDR.HIER.DAT then goto RDHIER -CONT91
        &TOTMAST = 1
        loop DOPHY &NUMPHY
          global &M&TOTMAST; &M&TOTMAST = "&RPHY&TOTMAST.~"
          &TOTMAST = &TOTMAST + 1
-DOPHY
        &TOTMAST = &NUMPHY
        goto CONT82
-RDHIER
        &TOTMAST = 1
        open &APPLDR.HIER.DAT as #1 for input
        loop DOMAST *
          read file #1 &RECSTR
          if not found then goto CONT81
          global &M&TOTMAST;&M&TOTMAST = &RECSTR
          &TOTMAST = &TOTMAST + 1
-DOMAST
-CONT81
        close #1
        &TOTMAST = &TOTMAST - 1

-CONT82
```

* Sort files in outgoing directory by physician (MAJOR) to xray id (MINOR)
* and load into ram array
        &ABORT = N
        edit tempx ex SORTLOAD.EDS NODISPLAY
        if (&ABORT = Y) then goto ALLDONE2 smsg "qBreaking out master files into sub-files ..."

* Erase any files in temporary directory
        quiet erase &OUTDIR.TEMP\*.*

* load into ram array
        open temp as #1 for input
        &HCMAP = 0       ;* # records written to MAP.DAT
        open &OUTDIR.TEMP\MAP.DAT as #4 for output
        loop LOADREC *
           read file #1 &RECSTR
           &RECSTR = &upper(&RECSTR)

* If EOF, then done loading
        if not found then goto CONT1

* Make sure there are 3 characters for extension
        if (&length(&trim(&substr(&RECSTR, 10, 3)))) <> 3) then
goto LOADREC

* Don't process any directories
        if (&substr(&RECSTR, 16, 5) = "<DIR>") then goto LOADREC &TOTFILES = &TOTFILES + 1              ;* increment file
counter

* Store filename
        &FILE&TOTFILES    =   "&trim(&substr(&RECSTR,  1,
8)).&trim(&substr(&RECSTR, 10, 3))"

* Store master physicians initials.  For subordinate phy's operations, extract
* position 13-15 of record (master phy.) and for no subordinate phy's, extract
* position 10-12 (just extension of filename).
        if    (&HIER   =   N)   then   &EXT&TOTFILES   =
"&trim(&substr(&RECSTR, 10, 3))"
        else &EXT&TOTFILES = "&trim(&substr(&RECSTR, 13, 3))"

* Init status of xfer (O = Outstanding)
        define &STAT&TOTFILES = "O"

* Split file into even bytes for each remote port
        gosub SPLIT &FILE&TOTFILES -LOADREC
-CONT1
        close #1
        close #4

* If no records written to MAP.DAT then erase it
        if (&HCMAP = 0) then quiet erase &OUTDIR.TEMP\MAP.DAT

* Erase temporary file
        quiet erase temp

* Check if user pressed F10 to abort
        if (&GETOUT = Y) then goto ALLDONE2

```
* Set completion flag for physicians with no files to be sent
        &Z = 1
        loop CHECKFIN &NUMPHY
           &Y = 1
           loop CHECKEXT &TOTFILES

* Match on file extension with physician in master list ?
           if (&EXT&Y = &RPHY&Z) then goto J99
           &Y = &Y + 1
-CHECKEXT
           &FIN&Z = "Y"             ;* set completion flag for
physician
-J99
           &Z = &Z + 1
-CHECKFIN

* Get directory relay gold is running in
        global &RUNREL
        &RUNREL = &RDRIVE
        if (&substr(&RUNREL,&length(&RUNREL),1) <> '\') then
&RUNREL = "&RUNREL\"

* Copy application online profile to relay's directory
        if exists &RUNREL.RELAY.ONP then copyfile &RUNREL.RELAY.ONP
&RUNREL.RELAY.HLD
        then copyfile &APPLDR.RELAY.ONP &RUNREL.RELAY.ONP
        else copyfile &APPLDR.RELAY.ONP &RUNREL.RELAY.ONP smsg "qDispatcher starting ..."
        &CNT = 1
        &HIGHPRI = 1              ;* pointer to highest priority
record
        loop INFIN *

* Check if user pressed F10 to abort
        if (&GETOUT = Y) then goto ALLDONE2

* debug line to shorten traces
        if (&DEBUG = Y) then wait 2

* If current record's file has already been sent or file is already
in
* progress of being sent, then skip to next record
        if (&STAT&CNT = "S") or (&STAT&CNT = "Q") then goto
CONT66

* Get # of ports available on remote PC
        gosub NUMPORT
        &CURRNPT = &retcode   ;* store # of ports remote PC has

* Loop through ports on central PC
        &CX = 1
        &PCNT = 0                 ;* init # of ports used by
physician (remote pc)
        &OFFAVAIL = ""            ;* init 1st offline session
available
        loop XFERCHK &NUMPORTS

* If offline session available, then assign relative session #
        if (&OFFAVAIL = "") and (&HSTAT&CX = "OFFLINE") then
&OFFAVAIL = &CX

* If match on physician, then increment counter for # of ports this
physician
```

```
* is currently using
          if (&EXT&CNT = &SPHY&CX) then &PCNT = &PCNT + 1
          then &CTEL&PCNT = &STEL&CX       ;* store tel. # in
use

* If match on physician and port status is online and idle and
there is a file
* outstanding
          if (&EXT&CNT = &SPHY&CX) and (&HSTAT&CX = "ONLINE") and
(&instr(OI,&STAT&CNT) > 0)
          else goto CONT29

* Make sure we have the next outstanding (sequential) file to send
to this
* physician
          gosub CHKOUT "&EXT&CNT"

* Update ptr to record
          &CNT = &YCNT

* Call subroutine to assign next sub-file (if any), and update
status's
* (ie. &SPL and &STAT)
          gosub ASSIGNFL &CX &CNT

* If filename is null (no outstanding files), then get next record if (&XFILE&CX = "") then goto CONT66
          substitute define &.SPHY&CX = "&EXT&CNT"    ;* assign
physicans initials
          substitute define &.IND&CX = &CNT ;* assign index to
record
          define &HSTAT&CX = "ONXFER"    ;* assign command
          gosub SHOWDISP "&fext(&FILE&CNT)" "&FILE&CNT" "ONXFER"
"&CNT" "&XFILE&CX"
          gosub SHOWALL
          goto CONT66

-CONT29
          &CX = &CX + 1

-XFERCHK
* If no offline session available, reset record ptr. back to
beginning
* of highest priority physician
          if (&OFFAVAIL = "") then &CNT = &HIGHPRI
          then goto CONT67

* If # of ports in use on current remote is less than the total #
of ports
* available on remote, then get next available tel # for remote PC if (&PCNT < &CURRNPT) then gosub GETNEXTN
          then &HRC = &retcode

* Else, no more ports available for current physician
          else goto CONT66

* If no tel. # was found, then process next record
          if (&HRC = 0) then goto CONT66

* Since a # was found, make sure we have next outstanding
(sequential) file to
* send to this physician
          gosub CHKOUT "&EXT&CNT" ;* get proper record ptr. for
``` this physician
```
        &CNT = &YCNT        ;* reset original record ptr. to proper
record ptr.

* Update status var for session

* Call subroutine to assign next sub-file (if any), and update status's
* (ie. &SPL and &STAT)
        gosub ASSIGNFL &OFFAVAIL &CNT

* If filename is null (no outstanding files), then get next record if (&XFILE&OFFAVAIL = "") then goto CONT66 substitute define &.SPHY&OFFAVAIL = "&EXT&CNT"  ;* assign
phy. initials
        substitute define &.STEL&OFFAVAIL = &NEWNUM     ;* assign
tel. #
        define &XREQ&OFFAVAIL = "CALL"    ;* assign sub-command substitute define &.IND&OFFAVAIL = &CNT  ;* assign index
to record
        define &HSTAT&OFFAVAIL = "OFFXFER"
        gosub SHOWDISP "&fext(&FILE&CNT)" "&FILE&CNT" "OFFXFER"
"&CNT" "&XFILE&OFFAVAIL"
        gosub SHOWALL -CONT66
        &CNT = &CNT + 1                  ;* increment record ptr.

* If record ptr has reached last record, then reset ptr. to 1st record
        if (&CNT > &TOTFILES) then &CNT = 1
-CONT67

* If any online sessions are idle (no xfer in progress), check if all files
* were sent for this physician
        &CX = 1                          ;* index for session
counter
        loop -CHECKST &NUMPORTS

* If session is not online and idle
        if (&HSTAT&CX <> "ONLINE") then goto CONT69

* For sub-file ops., update &STAT var using &SPL array for verification
        &BG = 1
        loop CHECKFL2 &TOTFILES
          gosub CHECKFL &BG
          &BG = &BG + 1
-CHECKFL2

* Since session is online and idle, check if all files were sent for this
* physician
        gosub CHKOUT "&SPHY&CX"
        &HRC = &retcode

* If no outstanding files and no transfers for this physician
        if (&HRC = 0) then goto CONT74
```

```
* If physician has transfers in progress but none outstanding
          if (&HRC = 2) then define &XREQ&CX = "HANGUP";* assign
command to session
          then define &HSTAT&CX = "HANGUP"    ;* update status var
for session
          then goto CONT69

* Implied outstanding files for this physician
*.Otherwise, send file
* Call subroutine to assign next sub-file (if any), and update
status's
* (ie. &SPL and &STAT)
          gosub ASSIGNFL &CX &YCNT

* If filename is null (no outstanding files), then get next record if (&XFILE&CX = "") then goto CONT69 substitute define &.SPHY&CX = "&EXT&YCNT"           ;*
assign phy. initials
          substitute define &.IND&CX = &YCNT ;* assign index to
record
          define &HSTAT&CX = "ONXFER"       ;* update status var
for session
          gosub  SHOWDISP   "&fext(&FILE&YCNT)"   "&FILE&YCNT"
"ONXFER" "&YCNT" "&XFILE&CX"
          gosub SHOWALL
          goto CONT69

* Since no more files for this physician, hangup session
-CONT74
          define &XREQ&CX = "HANGUP"            ;* assign command
to session
          define &HSTAT&CX = "HANGUP"           ;* update status var
for session

* Update file xfer completion flag for this physician
*temp line
          gosub UPDCOMPL &SPHY&CX

* Check if all xfer's for all physicians is complete
          gosub STATDONE
          &HRC = &retcode
          wait 2

* If all xfers completed, then wrap it up
          if (&HRC = 0) then goto ALLDONE

-CONT69
          &CX = &CX + 1
-CHECKST

-INFIN
-ALLDONE
        clear
        gosub SHOWALL
                                                    s    m    s    g
"q*---------------------------------------------------------------*"

smsg "q "
        smsg "q File transfers complete"
        smsg "q "
```

```
"q*----------------------------------------------------------------*"
                                                     s    m    s    g
        smsg "q "
        smsg "q "
        smsg "q "

* Erase any files in temporary directory
        quiet erase &OUTDIR.TEMP\*.*

* If old online profile existed before application ran, then
restore old profile
* Otherwise erase online profile from relay's directory
        if exists &RUNREL.RELAY.HLD then copyfile &RUNREL.RELAY.HLD
&RUNREL.RELAY.ONP
        then quiet erase &RUNREL.RELAY.HLD
        else &RUNREL.RELAY.ONP

*
* Cancel all sessions
*
-ALLDONE2
        &KILLNUM = 2     ;* init 1st session # to kill

* Loop session #2 to last session
        loop KILLSESS while (&KILLNUM <= &calc(&NUMPORTS + 1))

* Request to kill session
        gosub cancel &KILLNUM
        &HRC = &retcode

* If unable to cancel session, alert user
        if (&HRC>0)
* smsg "WUnable to cancel session #&KILLNUM!"
        &KILLNUM = &KILLNUM + 1
-KILLSESS

* Produce summary file
        gosub SHOWALL FILE

* Produce detail file
        gosub SHOWDET
        smsg "qFile transfer SUMMARY (by physician) in file
LOGSUM."
        smsg "qFile transfer in DETAIL (by file) in file LOGDET."

smsg "qTransfer request SEQUENCE in file LOGSEQ."

smsg "qApplication stopped ..."
        quiet stop all           ;* thats it folks !!

-CANCEL  quiet session stop &1
         if (&RC>0) return &RC
         smsg "q "
         smsg "QCancelling session #&1.  Please Stand by."
         global &CANCEL
         &CANCEL = "NO"
         on timer 5 &CANCEL = "YES"

loop -canwait while (&CANCEL="NO")
             quiet session status &1
-CANWAIT     if (&RC>0) goto -CANSTOP -CANSTOP on timer
         return 0
```

```
*----------------------------------------------------------------
------------*
* Subroutine to loop through # of ports per PC table
*----------------------------------------------------------------
------------*
-NUMPORT
        &XCNT = 1
        loop FINDPHY &NUMPHY

* If match on initials, then return # of ports on remote PC
        if (&EXT&CNT = &RPHY&XCNT) then return &RPT&XCNT
        &XCNT = &XCNT + 1

-FINDPHY
* No match found
        return 0

*----------------------------------------------------------------
------------*
* Subroutine to get next available # for remote PC
*----------------------------------------------------------------
------------*
-GETNEXTN
* loop through tel. #'s
        &XCNT = 1
        loop GETNUM &NUMTEL

* if no ports currently in use by this physician
        if (&PCNT = 0)
        else goto CONT58

* if match on physician, store 1st tel. #
        if (&EXT&CNT = &PHY&XCNT) then &NEWNUM = &TEL&XCNT
        then return 1
        goto CONT59

* loop through # of ports physician's PC is currently using
-CONT58
        &CT = 1
        &NEWNUM = ""
        loop TRAV1 &PCNT

*. if match on physician and tel # is in use then get next tel#
        if (&EXT&CNT = &PHY&XCNT) and (&TEL&XCNT = &CTEL&CT)
then goto CONT59

*  if match on physician and tel # is not in use, then store tel

        if (&EXT&CNT = &PHY&XCNT) and (&TEL&XCNT <> &CTEL&CT)
and (&NEWNUM = "") then &NEWNUM = &TEL&XCNT
        &CT = &CT + 1
-TRAV1

* If a # was found physicians PC was not currently using, then set
positive
* return code
        if (&NEWNUM <> "") then return 1
-CONT59
        &XCNT = &XCNT + 1
-GETNUM

* No available tel # for current physician
        &NEWNUM = ""
        return 0
```

```
*----------------------------------------------------------------
------------*
* Subroutine to check if current session for physician has any more
* files that need to be sent
*----------------------------------------------------------------
------------*
-CHKOUT &CPARM = "&1"    ;* store physicians initials
* Loop through record array
        &YCNT = 1                    ;* set index to beginning of array loop PERFCHK &TOTFILES

* If match on phy. then jump out
        if (&EXT&YCNT = &CPARM) then goto CONT60
        &YCNT = &YCNT + 1            ;* set index to next record

-PERFCHK

* Since we have index to 1st record for physician (&YCNT), then check if
* outstanding files exist
-CONT60

* Loop through records for physician
        &FLAGP = N                   ;* flag for in progress xfer's
        loop PERF1 &TOTFILES

* If outstanding file to send and match on physician then return a 1
* (outstanding files to send)
        if (&instr(OI,&STAT&YCNT) > 0) and (&EXT&YCNT = &CPARM)
then return 1

* If in progress xfer and match on physician, then set flag
        if (&STAT&YCNT = "Q") and (&EXT&YCNT = &CPARM) then
&FLAGP = Y
        &YCNT = &YCNT + 1

* If physician changed and physician had xfer's in progress
        if (&EXT&YCNT <> &CPARM) and (&FLAGP = Y) then return 2

* If physician changed and physician had no xfers in progress
        if (&EXT&YCNT <> &CPARM) and (&FLAGP = N) then return 0

-PERF1
        return 0                 ;* catch-all for no outstanding file to send

*----------------------------------------------------------------
------------*
* Subroutine to update file transfer completion flag for a physician
* (ie. all files were transferred for this physician)
*----------------------------------------------------------------
------------*
-UPDCOMPL
* Locate physician in array &FIN
        &ZCNT = 1
        &X1P = &1        ;* assign physicians initials
        loop LOCPHY &NUMPHY
```

```
* If physician match, then update status flag
        if (&X1P = &RPHY&ZCNT) then &FIN&ZCNT = "Y"
        then return              ;* return to caller
        &ZCNT = &ZCNT + 1
-LOCPHY
        return

*----------------------------------------------------------------
------------*
* Subroutine to check if all xfer's are completed for all
physicians
*----------------------------------------------------------------
------------*
-STATDONE
        &ZCNT = 1

* loop through status array
        loop CHKDONE &NUMPHY

* if a physician has files outstanding then return a 1
        if (&FIN&ZCNT = "N") then return 1
        &ZCNT = &ZCNT + 1
-CHKDONE
* all transfers complete
        return 0

*----------------------------------------------------------------
------------*
* Subroutine to display transfer requests
*----------------------------------------------------------------
------------*
-SHOWDISP
        clear
        &PARM1 = &1
        &PARM2 = &2
        &PARM3 = &3
        &PARM4 = &4
        &PARM5 = &5
        open logseq as #3 for append
                                                   s    m    s    g
"q*--------------------------------------------------------------
----------------*"
        write file #3 "&date &time Transfer request for physician
&PARM1"

* Show sub-file
        if (&PARM2<>&PARM5) then smsg "q&time Request for
physician: &PARM1  File: &PARM2  Sub-file: &PARM5"
        then write file #3 "File: &PARM2  Sub-file: &PARM5  PC
session state: &PARM3"
        else smsg "q&time Request for physician: &PARM1  File:
&PARM2"
        else write file #3 "File: &PARM2  PC session state: &PARM3"

write file #3 "Index to record: &PARM4"
                                                   s    m    s    g
"q*--------------------------------------------------------------
----------------*"
                          w    r    i    t    e       f    i    l    e       #   3
"*---------------------------------------------------------------
----------------*"
        close #3
        return
```

```
*---------------------------------------------------------------
------------*
* Subroutine to display status of xfer's by each physician
*---------------------------------------------------------------
------------*
-SHOWALL

* If a paramter of 'FILE' is passed, then stats are written to
LOGSUM
        &GPARM = &1 if (&GPARM = "FILE") then &GPARM = Y
        else &GPARM = N if (&GPARM = Y) then open LOGSUM as #2 for output
           then write file #2 "*--------------- DATE: &date    TIME:
&time ------------*"
           then write file #2 " "
           then write file #2 "            .         Communication Status by
Physician"
           then write file #2 "Phy       Total Files       Sent        In
Progress   Outstanding"
        else smsg "q                  Communication Status by Physician"

else smsg "qPhy       Total Files       Sent        In Progress
Outstanding"

&MCNT = 1
        &OLDPHY = "&fext(&FILE&MCNT)";&FCNT = 0;&FSCNT = 0;&FDCNT
= 0;&FOCNT = 0
        loop GETST &TOTFILES

* If physicians changed, then reset vars
        if (&fext(&FILE&MCNT) <> &OLDPHY) and (&GPARM = N)
                             t  h  e  n      s  m  s  g
"q&left(&OLDPHY,3)&left(,10)&left(&FCNT,3)&left(,9)&left(&FSCNT,3
)&left(,8)&left(&FDCNT,2)&left(,11)&left(&FOCNT,3)"

if (&fext(&FILE&MCNT) <> &OLDPHY) and (&GPARM = Y)
                       t h e n    w r i t e    f i l e    # 2
"&left(&OLDPHY,3)&left(,10)&left(&FCNT,3)&left(,9)&left(&FSCNT,3)
&left(,8)&left(&FDCNT,2)&left(,11)&left(&FOCNT,3)"

if (&fext(&FILE&MCNT) <> &OLDPHY)
        then &OLDPHY = &fext(&FILE&MCNT)
        then &FCNT = 0          ;* total files
        then &FSCNT = 0         ;* files sent
        then &FDCNT = 0         ;* files being sent
        then &FOCNT = 0         ;* files outstanding

* Increment accumulators
        &FCNT = &FCNT + 1
        if (&STAT&MCNT = "O") then &FOCNT = &FOCNT + 1
        else if (&STAT&MCNT = "I") or (&STAT&MCNT = "Q") then
&FDCNT = &FDCNT + 1
        else if (&STAT&MCNT = "S") then &FSCNT = &FSCNT + 1
        &MCNT = &MCNT + 1
-GETST
             if   ( & G P A R M  =   N )   t h e n    s m s g
"q&left(&OLDPHY,3)&left(,10)&left(&FCNT,3)&left(,9)&left(&FSCNT,3
)&left(,8)&left(&FDCNT,2)&left(,11)&left(&FOCNT,3)"
                       e l s e    w r i t e    f i l e    # 2
"&left(&OLDPHY,3)&left(,10)&left(&FCNT,3)&left(,9)&left(&FSCNT,3)
&left(,8)&left(&FDCNT,2)&left(,11)&left(&FOCNT,3)"
                            e l s e·  w r i t e    f i l e     # 2
"*---------------------------------------------------------------------*"
        else close #2
```

```
        return

*----------------------------------------------------------------
------------*
* Subroutine to display DETAIL report on xfer's by file
*----------------------------------------------------------------
------------*
-SHOWDET
        open LOGDET as #2 for output
        write file #2 "*---------------- DATE: &date   TIME: &time
-------------*"
        write file #2 " "
        write file #2 "              Communication Status by File"

write file #2 "                                      Transfer
    File   Time Transfer   Byte"
        write file #2 "Phy    Filename       Status          Time
    Size    Completed   /Sec  Port"
        &MCNT = 1
        loop GETST2 &TOTFILES

* Map for display
        gosub DOBREAK
        &MCNT = &MCNT + 1
-GETST2
        close #2
        return

*----------------------------------------------------------------
------------*
* Subroutine to breakout tokens for detail report
*----------------------------------------------------------------
------------*
-DOBREAK
* No sub-files
        if (&.SPL1&MCNT = &SPL1&MCNT) then goto CONT99

* Sub-files
* Get # of subfiles
                                        &   B   X   D           =
&substr(&SPL1&MCNT,&calc(&instr(&SPL1&MCNT,",")-1),1)
        &UCNT = 1
        &TOTBYT = 0;&TOTFT = 0
        &OUTSTAND = N;&HLDXCOM = ""

* Loop for # of sub-files
        loop GETSUB &BXD
            &HXD = &UCNT.&MCNT
            argstring &SPL&HXD    ;* breakout filename, status
            parse "," ...
            &HFILE = &1           ;* filename
            &HLDST = &2           ;* file status (I/O/S)

* Outstanding ?
            if (&HLDST <> S) then &STATUS = "Outstanding"
            then &XTIME = "";&XSIZE = "";&XCOM = "";&XBTSEC =
"";&XPORT = ""
                              then    & R E C & U C N T         =
"&left('',3)&left(,2)&left('(&HFILE)',12)&left(,2)&left(&STATUS,1
1)&left(,1)&left(&XTIME,11)&left(,1)&right(&XSIZE,8)&left(,4)&lef
t(&XCOM,8)&left(,4)&right(&XBTSEC,5)&left(,2)&left(&XPORT,5)"
            then &OUTSTAND = Y
            then &UCNT = &UCNT + 1
            then goto GETSUB
```

* Sent ?
            argstring &FTM&HXD      ;* breakout xfer info
            parse "~" ...
            &XTIME = &1;&XSIZE = &2;&XCOM = &3;&XPORT = &4

* Accum. byte size
            if (&datatype(&XSIZE) = NUM) then &TOTBYT = &TOTBYT +
&XSIZE
            &TOTFT = &TOTFT + &transl(&xtime,'.','')      ;* accum.
ft time (seconds.hh)

* If last sub-file, then store time xfer completed
            if (&BXD = &UCNT) then &HLDXCOM = &XCOM

* Develop bytes/sec
            if (&XSIZE = 0) then &XBTSEC = "N/A"
            else &XBTSEC = &calc(&XSIZE*100/&transl(&XTIME,'.',''))

* Develop xfer time
            if (&length(&XTIME)<=3) then &XTIME = "00:00:00&XTIME"

e l s e     & X T I M E       =
"&hours(&substr(&xtime,1,&calc(&instr(&xtime,'.')-1))).&substr(&X
TIME,&calc(&instr(&XTIME,'.')+1))"
            &STATUS = "Sent"
                            & R E C & U C N T            =
"&left('',3)&left(,2)&left('(&HFILE)',12)&left(,2)&left(&STATUS,1
1)&left(,1)&left(&XTIME,11)&left(,1)&right(&XSIZE,8)&left(,4)&lef
t(&XCOM,8)&left(,4)&right(&XBTSEC,5)&left(,2)&left(&XPORT,5)"
            &UCNT = &UCNT + 1

-GETSUB
* Create master file line
* Any outstanding sub-files ?
              i f    ( & O U T S T A N D     =    Y )    t h e n
&XTIME="";&XSIZE=&fsize(&OUTDIR.&FILE&MCNT);&XCOM="";&STATUS="Out
standing";then &XBTSEC="";then &XPORT=""
         then goto WRITE4

* No outstanding sub-files
         &STATUS="Sent";&XSIZE=&fsize(&OUTDIR.&FILE&MCNT)
         if (&HLDXCOM <> "") then &XCOM = &HLDXCOM
         else &XCOM = ""
         &XPORT="N/A"

* Develop bytes/sec
         if (&XSIZE = 0) then &XBTSEC = "N/A"
         else &XBTSEC = &calc(&XSIZE*100/&transl(&TOTFT,'.',''))

* Develop total xfer time
         if (&TOTFT<=2) then &TOTFT = ".&TOTFT"
                            e l s e    & T O T F T       =
&substr(&TOTFT,1,&calc(&length(&TOTFT)-2)).&substr(&TOTFT,&calc(&
length(&TOTFT)-1),2)
         if (&length(&TOTFT)<=3) then &XTIME = "00:00:00&TOTFT"
                            e l s e     & X T I M E       =
"&hours(&substr(&TOTFT,1,&calc(&instr(&TOTFT,'.')-1))).&substr(&T
OTFT,&calc(&instr(&TOTFT,'.')+1))"

-WRITE4

* Write master file record
                      w r i t e       f i l e      # 2

```
"&left(&fext(&FILE&MCNT),3)&left(,2)&left(&FILE&MCNT,12)&left(,2)
&left(&STATUS,11)&left(,1)&left(&XTIME,11)&left(,1)&right(&XSIZE,
8)&left(,4)&left(&XCOM,8)&left(,4)&right(&XBTSEC,5)&left(,2)&left
(&XPORT,5)"

* Write all subfiles
        &UCNT = 1
        loop WRITESUB &BXD
           write file #2 "&REC&UCNT"
           &UCNT = &UCNT + 1
-WRITESUB
        return

* No sub-files
-CONT99
* Outstanding ?
        if (&STAT&MCNT <> "S") then &STATUS = "Outstanding"
        then &XTIME = "";&XSIZE = "";&XCOM = "";&XBTSEC = "";&XPORT
= ""
        then goto WRITE3

* Sent
        argstring &FTIME&MCNT
        parse "~" ...

&XTIME = &1;&XSIZE = &2;&XCOM = &3;&XPORT = &4

* Develop bytes/sec
        if (&XSIZE = 0) then &XBTSEC = "N/A"
        else &XBTSEC = &calc(&XSIZE*100/&transl(&XTIME,'.',''))

* Develop xfer time
        if (&length(&XTIME)<=3) then &XTIME = "00:00:00&XTIME"
                         else  & X T I M E   =
"&hours(&substr(&xtime,1,&calc(&instr(&xtime,'.')-1))).&substr(&X
TIME,&calc(&instr(&XTIME,'.')+1))"
        &STATUS = "Sent"
-WRITE3
                         write  file  # 2
"&left(&fext(&FILE&MCNT),3)&left(,2)&left(&FILE&MCNT,12)&left(,2)
&left(&STATUS,11)&left(,1)&left(&XTIME,11)&left(,1)&right(&XSIZE,
8)&left(,4)&left(&XCOM,8)&left(,4)&right(&XBTSEC,5)&left(,2)&left
(&XPORT,5)"
        return

*-----------------------------------------------------------------
------------*
* Subroutine to split file into even bytes per remote port
*-----------------------------------------------------------------
------------*
-SPLIT
        &FILE = &1

* Get # of ports for remote PC
        &CNT = &TOTFILES
        gosub NUMPORT
        &HRC = &retcode

* If Diagnostic PC has less ports than remote, then split file for
# of ports
* on diag
        if (&NUMPORTS < &HRC) then &SPLITNUM = &NUMPORTS
        else &SPLITNUM = &HRC

*  Assign  MAP.DAT  variable  (format  ==>
12345123.001,FILE1.12,FILE1.22)
        &TEMPMAP = "&FILE"
```

```
* If only 1 port available to transfer file
        if (&SPLITNUM = 1) then goto OUT1

* Calc # bytes per file
        &HSIZE = &fsize(&OUTDIR.&FILE)

* If file is less than 2K, then don't bother splitting up
        if (&HSIZE < 2048) then goto OUT1

* SIZE OF FILE / # OF PORTS USABLE / 256
        &HRECS = &HSIZE/&SPLITNUM
        &hrecs = &hrecs/256
        &SEQ = 1
        open &OUTDIR.&FILE as #3 for input stream binary

* loop for # of chunks to split file into
        &SPCNT = 1
        loop READSP &SPLITNUM

* Init total xfer time, bytesize of file, xfer complete time, com
port used

* Variable name conventions ==> &FTM<seq. # of file><index to
filename>
        &HXD = &SEQ.&TOTFILES
        define &FTM&HXD = ""

* Append temp filename to variable followed by status of O
(Outstanding)
* Conventions &SPLnx where 'n' represents the seq # of the file and
'x'
* represents the index to master file array
                substi  define  &.SPL&HXD   =
"FILE&TOTFILES..&SEQ.&SPLITNUM,O"

* Append temp filename to MAP.DAT variable
        &TEMPMAP = "&TEMPMAP.,FILE&TOTFILES..&SEQ.&SPLITNUM"

open &OUTDIR.TEMP\FILE&TOTFILES..&SEQ.&SPLITNUM as #2 for
output stream binary

* loop for # records for each temp file
-FRAC
        loop DUMPREC &HRECS
          read file #3 &RECSTR length 256
          if not found then goto DONEREAD
          write file #2 &RECSTR
-DUMPREC

* If writing to last file and last record did not reach end of
file, then
* attempt to read next record
        if (&SPCNT = &SPLITNUM) and (&FOUND = YES) then goto FRAC

&SPCNT = &SPCNT + 1

-DONEREAD
        close #2

&SEQ = &SEQ + 1
-READSP
        close #3

* Write to MAP.DAT
        write file #4 "&TEMPMAP"
        &HCMAP = &HCMAP + 1         ;* increment record counter for
```

```
MAP.DAT
-OUT1
        return

*----------------------------------------------------------------------*
* Subroutine to assign next sub-file (if any), and update status's
* (ie. &SPL and &STAT)
*----------------------------------------------------------------------*

-ASSIGNFL
        &PARM1 = &1      ;* assign index for &XFILE (relative comm #)
        &PARM2 = &2      ;* assign index for &STAT and &FILE (master file)

* Determine how many subfiles master file is broken up into (if any)
* If var not initialized, then assume no sub-files were built for this file
* and assign master filename
        if   (&.SPL1&PARM2   =   &SPL1&PARM2)   then   substi define
&.XFILE&PARM1 = "&FILE&PARM2"

* assign all files queued and none outstanding
        then define &STAT&PARM2 = "Q"
        then return

* Since sub-files were found, determine next file to send (if any more) and
* update status vars
        &INPROG = N
        &UCNT = 1                    ;* init index to 1st sub file

* Get total # of sub-files
                                &   B   X   D     =
&substr(&SPL1&PARM2,&calc(&instr(&SPL1&PARM2,",")-1),1)

* loop for # of sub-files
        loop CHECKSP &BXD
            &HXD = &UCNT.&PARM2
            argstring &SPL&HXD
            parse "," ...

* If sub-file is outstanding then jump out
            if (&2 = "O") then goto OUT5

* If sub-file is in progress, then flag
            if (&2 = "I") then &INPROG = Y
            &UCNT = &UCNT + 1        ;* increment sub-file counter
-CHECKSP

* Assumed no outstanding sub-files for master file
* Any in progress ?
        if (&INPROG = Y) then define &STAT&PARM2 = "Q"

* Else flag for all subfiles sent
        else define &STAT&PARM2 = "S"
        define &XFILE&PARM1 = ""     ;* assign null filename
        return

* Assumed outstand. files to be sent
-OUT5
* Assign filename to send
        substi define &.XFILE&PARM1 = "&1"
```

```
        substi define &.SPL&HXD = "&1.,I"  ;* filename and in
progress status

* If there are still more sub-files outstanding and sub-file in
progress
        if (&UCNT < &BXD) then define &STAT&PARM2 = "I"

* Else no more sub-files outstanding and sub-file in progress
        else define &STAT&PARM2 = "Q"
        return

*--------------------------------------------------------------
-----------*
* Subroutine update file status (&STAT) for sub-file ops.
*--------------------------------------------------------------
-----------*
-CHECKFL
        &PARM1 = &1      ;* assign index for &STAT (master file)

* If no sub-files, then return
        if (&.SPL1&PARM1 = &SPL1&PARM1) then return

* Since sub-files were found, update status vars
        &INPROG = N
        &UCNT = 1                ;* init index to 1st sub file

* Get total # of sub-files
                                              &BXD         =
&substr(&SPL1&PARM1,&calc(&instr(&SPL1&PARM1,",")-1),1)

* loop for # of sub-files
        loop CHECKSP2 &BXD
           &HXD = &UCNT.&PARM1
           argstring &SPL&HXD
           parse "," ...

* If sub-file is outstanding or in progress then return
           if (&2 = "O") or (&2 = "I") then return
           &UCNT = &UCNT + 1     ;* increment sub-file counter
-CHECKSP2
* Assumed no outstanding sub-files for master file
* flag for all subfiles sent
* If status var already set to S (sent) then return
        if (&STAT&PARM1 = "S") then return
        define &STAT&PARM1 = "S"
        return

* Update file xfer completion flag for this physician
*temp line
*       gosub UPDCOMPL &EXT&PARM1

* Check if all xfer's for all physicians is complete
*       gosub STATDONE
*       &HRC = &retcode
*       wait 2
*
* If all xfers completed, then wrap it up
*       return &HRC
^Z

* SCRIPT: READCONF.SCR
*
* FUNCTION: Read configuration and telephone files into RAM vars on error
        on attnkey F10 &GETOUT = Y
```

```
* Read configuration file
        if not exists &APPLDR.CONFIG.DAT then clear
        then  smsg  "q&APPLDR.CONFIG.DAT  does  not  exists.
Application cannot continue."
        then read line &Q1 "qPress ENTER."
        then quiet stop all

* Load records in configuration file into vars
        &NUMPORTS = 0                     ;* init # of valid ports
        open &APPLDR.CONFIG.DAT as #1 for input
        if (&retcode <> 0) then clear
        then  smsg  "qProblem  opening  file  &APPLDR.CONFIG.DAT.
Application cannot continue."
        then read line &Q1 "qPress ENTER."
        then quiet stop all

* Read 1st record (outgoing directory)
        read file #1 &XOUTDIR
        if not found then clear
        then smsg "q1st record in file &APPLDR.CONFIG.DAT must be
outgoing directory name."
        then read line &Q1 "qApplication cannot continue.  Press
ENTER."
        then quiet stop all
        &XOUTDIR = &trim(&XOUTDIR)
        if  (&substr(&XOUTDIR,&length(&XOUTDIR),1)  <>  '\')  then
&XOUTDIR = "&XOUTDIR\"
        substitute define &.OUTDIR = &XOUTDIR

* Loop until end of file
        loop READREC *
          read file #1 &RECSTR           ;* read a record
          if not found then goto CONT1   ;* EOF ?

argstring &RECSTR              ;* breakout tokens
          parse "~" ...                  ;* parse using the tilde

* Make sure we have 6 parameters
        if (&N <> 6) then clear
        then  smsg  "qInvalid  #  of  parameters  in  line
#&calc(&NUMPORTS +1) of file &APPLDR.CONFIG.DAT."
        then read line &Q1 "qApplication cannot continue. Press
ENTER."
        then quiet stop all

* Increment port counter
        &NUMPORTS = &NUMPORTS + 1
*.Assign entry name
        substitute define &.EN&NUMPORTS = "&trim(&upper(&1))"

* Assign port #
        global &PORT&NUMPORTS
        &PORT&NUMPORTS = "&trim(&2)"

* Assign modem speed
        global &SPEED&NUMPORTS
        &SPEED&NUMPORTS = "&trim(&upper(&3))"

* Assign port type
        global &PTYPE&NUMPORTS
        &PTYPE&NUMPORTS = "&trim(&upper(&4))"

* Assign modem type
        global &MODEM&NUMPORTS
        &MODEM&NUMPORTS = "&trim(&upper(&5))"
```

```
* Assign modem name/class
        global &MNAME&NUMPORTS
        &MNAME&NUMPORTS = "&trim(&upper(&6))"

* Make sure relay's setting match configuration file
        quiet directory query &EN&NUMPORTS MSPEED &HSPEED TYPE
&HTYPE COMPORT &HPORT
        &HRC = &retcode

* If entry name does not exist, then build it with appropriate
options
        if (&HRC = 2) then gosub BUILDENT
        then goto CONT4

* Make sure modem speed, comm port and type of connection are
correct in Relay's
* Directory of Computers
        if    (&HSPEED    <>    &SPEED&NUMPORTS)    or    (&HPORT    <>
&PORT&NUMPORTS) or (&HTYPE <> "TTY")
        then  quiet  directory  update  "&EN&NUMPORTS"  MSPEED
&SPEED&NUMPORTS TYPE TTY COMPORT &PORT&NUMPORTS -CONT4
* Make sure port type, modem type and modem name/class are correct
in Relay's
* personal computer options
        reset &HTYPE;reset &HMODEM;reset &HNAME
        quiet directory qoption comport &PORT&NUMPORTS &HTYPE
&HMODEM &HNAME
        if ("&HTYPE" <> "&PTYPE&NUMPORTS") or ("&HMODEM" <>
"&MODEM&NUMPORTS") or ("&HNAME"<> "&MNAME&NUMPORTS")
        then quiet directory soption comport &PORT&NUMPORTS
&PTYPE&NUMPORTS &MODEM&NUMPORTS "&MNAME&NUMPORTS"

-READREC
-CONT1
        close #1
* Make sure central PC has at least 1 com port
        if (&NUMPORTS < 1) then clear
        then smsg "qThere must be at least 1 com port for
application to run.  Check file"
        then read line &Q1 "q&APPLDR.CONFIG.DAT.  Press ENTER."
        then quiet stop all

* Read telephone/physician file
        if not exists &APPLDR.TEL.DAT then clear
        then read line &Q1 "q&APPLDR.TEL.DAT does not exists.
Application cannot continue. Press ENTER."
        then quiet stop all

* Load records in telephone file into vars
        &NUMTEL = 0                          ;* init # of valid ports
        open &APPLDR.TEL.DAT as #1 for input
        if (&retcode <> 0) then clear
        then   smsg   "qProblem   opening   file   &APPLDR.TEL.DAT.
Application cannot continue."
        then read line &Q1 "qPress ENTER."
        then quiet stop all

* Read all records
        &OLDPHY = ""
        &NUMPHY = 0
        &1STTIME = Y
        loop READTEL *
          read file #1 &RECSTR          ;* read a record
          if not found then &NUMPHY = &NUMPHY + 1
          then global &RPT&NUMPHY
```

```
        then &RPT&NUMPHY = &PHYCNT             ;* store # of
sessions phy. has
        then global &RPHY&NUMPHY
        then &RPHY&NUMPHY = &OLDPHY            ;* store phy.
initials
        then global &FIN&NUMPHY
        then &FIN&NUMPHY = N                   ;* ft's complete
flag for phy.
        then goto CONT2                        ;* jump out argstring &RECSTR                      ;* breakout tokens
        parse "~" ...                          ;* parse using the tilde

* Make sure we have 2 parameters
        if (&N <> 2) then clear
        then  smsg  "qInvalid  #  of  parameters  in  line
#&calc(&NUMTEL +1) of file &APPLDR.TEL.DAT."
        then read line &Q1 "qApplication cannot continue. Press
ENTER."
        then quiet stop all

* For 1st time through loop, store the physicians id
        if (&1STTIME = Y) then &OLDPHY = &upper(&1)
        then &1STTIME = N
        then &PHYCNT = 0
* If physician initial's has changed, then store # of sessions
remote PC has
* NOTE: array &RPHYn (physician's initials) and &RPTn (total # of
sessions per
*       remote PC) are built here
        if (&upper(&1) <> &OLDPHY) then &NUMPHY = &NUMPHY + 1
        then global &RPT&NUMPHY
        then &RPT&NUMPHY = &PHYCNT             ;* store # of
sessions phy. has
        then global &RPHY&NUMPHY
        then &RPHY&NUMPHY = &OLDPHY            ;* store phy.
initials
        then global &FIN&NUMPHY
        then &FIN&NUMPHY = N                   ;* ft's complete
flag for phy.
        then &PHYCNT = 0                       ;* re-init session
counter
        then &OLDPHY = "&upper(&1)"            ;* assign phy
initials &NUMTEL = &NUMTEL + 1                  ;* increment record counter
        &PHYCNT = &PHYCNT + 1                  ;* increment session
counter for remote

* Assign physicians initials
        global &PHY&NUMTEL
        &PHY&NUMTEL = "&upper(&1)"

* Assign telephone #
        global &TEL&NUMTEL
        &TEL&NUMTEL = "&2"
-READTEL
-CONT2
        close #1

* Check for at least 1 record
        if (&NUMTEL < 1) then clear
        then smsg "qFile &APPLDR.TEL.DAT must contain at least 1
record. Application cannot"
        then smsg "qcontinue. Press ENTER."
        then quiet stop all
```

* Return control to calling script (normal termination)
        stop

* Subroutine to build an entry in the directory of computers
-BUILDENT

* Build entry name using entry name 'A HOST' as the model
        quiet directory add "&EN&NUMPORTS" "A HOST"
        &HRC = &retcode

* Entry name 'A HOST' not found ?
        if (&HRC = 2) then clear
        then smsg "qEntry Name 'A HOST' must be created on your copy of Relay Gold. To create"
        then smsg "qa new Entry Name, enter the Directory of Computers and copy an entry of"
        then read line &Q1 "qTYPE 'TTY'. Then, name the new Entry Name 'A HOST'. Press ENTER."
        then quiet stop all

* No room on disk ?
        if (&HRC = 3) then clear
        then read line &Q1 "qNo room on disk to create new entry name. Press ENTER."
        then quiet stop all

* Update new entry name with proper modem speed, type, comments,
        quiet    directory    update    "&EN&NUMPORTS"    MSPEED
&SPEED&NUMPORTS TYPE TTY COMMENTS "PORT #&NUMPORTS FOR SCRIPT"
COMPORT &PORT&NUMPORTS TELEPHONE ""
        return
* SCRIPT: SESSOFF.SCR
*
* FUNCTION: Performs calls, transfers, hangups etc. for each session on the
*            central pc on error

* perform trace if debug on
        if (&DEBUG = Y) then strace LOG&SESSIONID
        on nomemory smsg "qOut of memory session # &SESSIONID global &ASYNCNUM &HSEQ

* Assign communications session number
        &ASYNCNUM = &1

* Retrieve communication port # for this session
        directory query &EN&ASYNCNUM comport &HPORT

* Retrieve modem type for this session
        directory qoption comport &HPORT &DUMMY1 &MODEMNAM

* If modem type is QX (Microcom), then set special modem variable to
* submit 'AT' instruction to modem
        if (&upper(&MODEMNAM) = QX) then global &$MICMD
*       then &$MICMD = "\N3\Q3\J0%C3"

* For super duper QX/4232hs (latest & greatest)
        then &$MICMD = "%C0%G1%BT12000"

* Initialize sessions variables
        define &HSTAT&ASYNCNUM = "OFFLINE"

```
        define &STEL&ASYNCNUM = ""
        define &XREQ&ASYNCNUM = ""
        define &XFILE&ASYNCNUM = ""

* Wait for driving session to request an xfer
-WAITAG
        wait (&XREQ&ASYNCNUM <> "")

* If request for call, then proceed
        if (&XREQ&ASYNCNUM = "CALL") then goto DOCALL
        else goto WAITAG

-DOCALL

&ATTEMPTS = 1
-DOCALL2
* Attempt to perform call. If successful execute online script
SESSON.
        call "&EN&ASYNCNUM" &STEL&ASYNCNUM ex SESSON
        &HRC = &retcode
* Error messages based on return code
* If line dropped before xfer completed, then send file again
        if (&HRC = 99) then &MESSG = "Inadvertent line drop before
file transfer was completed."
        else if (&HRC = 0) then &MESSG = "Normal disconnect from
PC"
        else if (&HRC = 2) then &MESSG = "Insufficient memory for
the connection."
        else if (&HRC = 3) then &MESSG = "Communication port is not
operational."
        else if (&HRC = 4) then &MESSG = "User pressed ESC while
dialing, cancelling the call."
        else if (&HRC = 5) then &MESSG = "The modem is not
responding properly."
        else if (&HRC = 6) then &MESSG = "No carrier detected on
line."
        else if (&HRC = 7) then &MESSG = "The other computer is
busy."
        else if (&HRC = 8) then &MESSG = "Voice detected on
telephone line."
        else if (&HRC = 9) then &MESSG = "No dial tone on telephone
line."
        else if (&HRC = 15) then &MESSG = "Entry Name
'&EN&ASYNCNUM' not in the Directory of Computers."
        else if (&HRC = 98) then &MESSG = "Problem with initial
connection."

* Successful file transfer (continue)
        if (&HRC = 0) then goto CONT1

* Check for fatal codes
        if (&HRC = 2) or (&HRC = 3) or (&HRC = 4) or (&HRC = 15)

else goto CONT99
        &MESSG = "Fatal error for Entry Name &EN&ASYNCNUM - port
unusable."

* Set flag for file transfer back to OUTSTANDING
        define &STAT&IND&ASYNCNUM = "O"
        &XYZ = &IND&ASYNCNUM

* If sub-file, then make sure to update status var &SPL
        if (&SPL1&XYZ = &SPL1&XYZ) then
        &HSEQ = &substr(&fext(&XFILE&ASYNCNUM),1,1)
        &HSEQ = &HSEQ.&IND&ASYNCNUM
        substi define &.SPL&HSEQ = "&XFILE&ASYNCNUM,O"
```

```
            goto CONT1

-CONT99
* Check for non-fatal codes (retry)
        &ATTEMPTS = &ATTEMPTS + 1        ;* increment retry counter

* Over max attempts ?
        if (&ATTEMPTS > 5) then &MESSG = "5 unsuccessful attempts
for #&STEL&ASYNCNUM phy:&SPHY&ASYNCNUM Entry:&EN&ASYNCNUM"
* Set flag for file transfer back to OUTSTANDING
        then define &STAT&IND&ASYNCNUM = "O"
        then goto CONT1

* Try again
        else goto DOCALL2

* Proceed to wait for another instruction from driving session
-CONT1
        define &XREQ&ASYNCNUM = ""       ;* reset request command define &HSTAT&ASYNCNUM = "OFFLINE"      ;* set session
status to OFFLINE
        goto WAITAG
^Z
* SCRIPT: SESSON.SCR
*
* FUNCTION: Performs online duties for communication session
          on error

* Use relay's compressed protocol (type RC)
*       set protocol relay compress

* Switch to split screen mode
*       switch relay

* If Relay's Protocol not established in 60 seconds, assume bad
line quality
* or problems with modems and return code of 98
        wait 60 (&CSERIAL <> "")
        if timeout then define &HSTAT&ASYNCNUM = "OFFXFER";then
hangup 98

* Use hardware flow control
*       wait 1
*       wait (&sesactive = 1)
*       substi session switch #&calc(&asyncnum + 1)
*       set insmode off          ;* turn off insert mode
*       stack "[ESCAPE][F5][TAB][TAB][TAB][TAB][TAB][TAB]H[enter]"

wait 1
        reset &receive           ;* in case any junk chars
*       session switch #1

* If inadvertent disconnection occurs before protocol established,
then
* provide return code of 98
        on disconnect define &HSTAT&ASYNCNUM = "OFFXFER";hangup 98

* Update status var for session to signify online connection was
made
        define &HSTAT&ASYNCNUM = "ONXFER"

* Make sure other PC is in synch with proper protocol and script
control
```

```
* character. (good security feature)
        &ATTEMPTS = 0
-SECURITY
        send "$send 'TEST'"             ;* send string
        wait 4 "TEST"                   ;* wait for positive
confirmation
        if not timeout then goto STARTSD ;* if received positive
confirmation
        &ATTEMPTS = &ATTEMPTS + 1       ;* increment attempts
counter

* Max attempts ?
        if   (&ATTEMPTS  >  4)  then  define  &HSTAT&ASYNCNUM  =
"OFFXFER";then hangup 98
        else goto SECURITY -STARTSD
* If MAP.DAT exists for sub-file reconstruction, then send it
        if    exists   &OUTDIR.TEMP\MAP.DAT    then    sendf
&OUTDIR.TEMP\MAP.DAT
        then wait until sending .
        then send "$recvf MAP.DAT NOBACKUP"
        then wait while sending -SENDAG
* If inadvertent line drop before xfer is complete, then tell
offline script
* to try again
        on disconnect define &HSTAT&ASYNCNUM = "OFFXFER";hangup 99

*       reset &STIME
* Attempt to send file
        wait 0.5

* If no sub-files, then send file from outgoing dircectory
        &XYZ = &IND&ASYNCNUM
        if   (&.SPL1&XYZ   =   &SPL1&XYZ)   then   sendfile
&OUTDIR.&XFILE&ASYNCNUM

* For sub-files, send file from outgoing\TEMP directory
        else sendfile &OUTDIR.TEMP\&XFILE&ASYNCNUM
        wait until sending
        send "$recvf &XFILE&ASYNCNUM NOBACKUP"
        &BEGIN = &TIMETH

* Wait until entire file has been transferred
        wait while sending
        &END = &TIMETH

* Update status var for record associated with file that just got
transferred
* successfully. (&IND&ASYNCNUM provides index to array &STAT for
proper
* record to update)

* If no sub-files for master file, then update status var
        if (&.SPL1&XYZ = &SPL1&XYZ) then define &STAT&IND&ASYNCNUM
= "S"

* otherwise for sub-files, update status var
        else &HSEQ = &substr(&fext(&XFILE&ASYNCNUM),1,1)
        else &HSEQ = &HSEQ.&IND&ASYNCNUM
        else substi define &.SPL&HSEQ = "&XFILE&ASYNCNUM,S"
```

* Also, store xfer time, byte size of file, time transfer completed and com
* port used
* Develop xfer time in format TOTAL SECONDS.HUNDRETHS OF SECONDS

```
        &HBEG = &seconds(&substr(&BEGIN,1,8))*100
        &HEND = &seconds(&substr(&END,1,8))*100
        &THBEG = &substr(&BEGIN,10,2)
        &THEND = &substr(&END,10,2)
        &HBEG = &HBEG+&THBEG
        &HEND = &HEND+&THEND
        &DIF = &HEND-&HBEG
        if (&length(&DIF) <= 2) then &DIF = ".&right(&DIF,2,0)"
                        e l s e    & D I F   =
"&substr(&DIF,1,&calc(&length(&DIF)-2)).&substr(&DIF,&calc(&lengt
h(&DIF)-1))"
```

* If no sub-files, update status info
```
        if (&.SPL1&XYZ = &SPL1&XYZ) then substi define &.FTIME&XYZ
= "&DIF~&fsize(&OUTDIR.&XFILE&ASYNCNUM)~&time~&COMPORT"
```

* Otherwise for sub-files, update status info
```
             else    substi    define    &.FTM&HSEQ    =
"&DIF~&fsize(&OUTDIR.TEMP\&XFILE&ASYNCNUM)~&time~&COMPORT"
```

* Tell driving session file has been transferred and line is idle

```
        define &HSTAT&ASYNCNUM = "ONLINE"
```

* If inadvertent line drop occurs while we are waiting for an instruction
* then update status var that we are hanging up
```
        on disconnect define &HSTAT&ASYNCNUM = "HANGUP";hangup 0
```

* Wait for driving session to either request another xfer for this physician or
* to hangup (no more files pending for this physician)
-WAITAG

* if debug on wait 1 second so trace doesn't get large
```
        if (&DEBUG = Y) then wait 1
        substitute if (&HSTAT&ASYNCNUM = "ONLINE") then goto WAITAG
```

* If another file to send to same physician, then start xfer
```
        substitute if (&HSTAT&ASYNCNUM = "ONXFER") then goto SENDAG
```

* Disable line drop monitor
```
        on disconnect
```

* Tell remote PC to hangup with a return code of 66 (normal termination)
```
        send "$HANGUP 66"
        wait until idle
```

* Update status flag
```
        define &HSTAT&ASYNCNUM = "HANGUP"
```

* Otherwise, hangup with OK return code
```
        hangup 0
```
^Z

```
* SCRIPT: SESSON.SCR
*
* FUNCTION: Performs online duties for communication session
            on error

* Use relay's compressed protocol (type RC)
*        set protocol relay compress

* Switch to split screen mode
*        switch relay

* If Relay's Protocol not established in 60 seconds, assume bad
line quality
* or problems with modems and return code of 98
        wait 60 (&CSERIAL <> "")
        if timeout then define &HSTAT&ASYNCNUM = "OFFXFER";then
hangup 98

* Use hardware flow control
*        wait 1
*        wait (&sesactive = 1)
*        substi session switch #&calc(&asyncnum + 1)
*        set insmode off          ;* turn off insert mode
*        stack "[ESCAPE][F5][TAB][TAB][TAB][TAB][TAB][TAB]H[enter]"

*        wait 1
         reset &receive           ;* in case any junk chars
*        session switch #1

* If inadvertent disconnection occurs before protocol established,
then
* provide return code of 98
        on disconnect define &HSTAT&ASYNCNUM = "OFFXFER";hangup 98

* Update status var for session to signify online connection was
made
        define &HSTAT&ASYNCNUM = "ONXFER"

* Make sure other PC is in synch with proper protocol and script
control
* character. (good security feature)
        &ATTEMPTS = 0
-SECURITY
        send "$send 'TEST'"              ;* send string
        wait 4 "TEST"                    ;* wait for positive
confirmation
        if not timeout then goto STARTSD ;* if received positive
confirmation
        &ATTEMPTS = &ATTEMPTS + 1        ;* increment attempts
counter

* Max attempts ?
        if (&ATTEMPTS > 4) then define &HSTAT&ASYNCNUM =
"OFFXFER";then hangup 98
        else goto SECURITY -STARTSD
* If MAP.DAT exists for sub-file reconstruction, then send it
        if exists &OUTDIR.TEMP\MAP.DAT then sendf
&OUTDIR.TEMP\MAP.DAT
        then wait until sending
        then send "$recvf MAP.DAT NOBACKUP"
        then wait while sending
```

-SENDAG
* If inadvertent line drop before xfer is complete, then tell offline script
* to try again
            on disconnect define &HSTAT&ASYNCNUM = "OFFXFER";hangup 99

*        reset &STIME
* Attempt to send file
            wait 0.5

* If no sub-files, then send file from outgoing dircectory
            &XYZ = &IND&ASYNCNUM
            if    (&.SPL1&XYZ   =   &SPL1&XYZ)    then    sendfile
&OUTDIR.&XFILE&ASYNCNUM

* For sub-files, send file from outgoing\TEMP directory
            else sendfile &OUTDIR.TEMP\&XFILE&ASYNCNUM
            wait until sending
            send "$recvf &XFILE&ASYNCNUM NOBACKUP"
            &BEGIN = &TIMETH

* Wait until entire file has been transferred
            wait while sending
            &END = &TIMETH

* Update status var for record associated with file that just got transferred
* successfully. (&IND&ASYNCNUM provides index to array &STAT for proper
* record to update)

* If no sub-files for master file, then update status var
            if (&.SPL1&XYZ = &SPL1&XYZ) then define &STAT&IND&ASYNCNUM = "S"

* otherwise for sub-files, update status var
            else &HSEQ = &substr(&fext(&XFILE&ASYNCNUM),1,1)
            else &HSEQ = &HSEQ.&IND&ASYNCNUM
            else substi define &.SPL&HSEQ = "&XFILE&ASYNCNUM,S"

* Also, store xfer time, byte size of file, time transfer completed and com
* port used
* Develop xfer time in format TOTAL SECONDS.HUNDRETHS OF SECONDS &HBEG  = &seconds(&substr(&BEGIN,1,8))*100
            &HEND  = &seconds(&substr(&END,1,8))*100
            &THBEG = &substr(&BEGIN,10,2)
            &THEND = &substr(&END,10,2)
            &HBEG  = &HBEG+&THBEG
            &HEND  = &HEND+&THEND
            &DIF   = &HEND-&HBEG
            if (&length(&DIF) <= 2) then &DIF = ".&right(&DIF,2,0)"
                                   e l s e     & D I F      =
"&substr(&DIF,1,&calc(&length(&DIF)-2)).&substr(&DIF,&calc(&length(&DIF)-1))"

* If no sub-files, update status info
            if (&.SPL1&XYZ = &SPL1&XYZ) then substi define &.FTIME&XYZ
= "&DIF~&fsize(&OUTDIR.&XFILE&ASYNCNUM)~&time~&COMPORT"

* Otherwise for sub-files, update status info
                else   substi   define    &.FTM&HSEQ    =
"&DIF~&fsize(&OUTDIR.TEMP\&XFILE&ASYNCNUM)~&time~&COMPORT"

```
* Tell driving session file has been transferred and line is idle
        define &HSTAT&ASYNCNUM = "ONLINE"

* If inadvertent line drop occurs while we are waiting for an instruction
* then update status var that we are hanging up
        on disconnect define &HSTAT&ASYNCNUM = "HANGUP";hangup 0

* Wait for driving session to either request another xfer for this physician or
* to hangup (no more files pending for this physician)
-WAITAG

* if debug on wait 1 second so trace doesn't get large
        if (&DEBUG = Y) then wait 1
        substitute if (&HSTAT&ASYNCNUM = "ONLINE") then goto WAITAG

* If another file to send to same physician, then start xfer
        substitute if (&HSTAT&ASYNCNUM = "ONXFER") then goto SENDAG

* Disable line drop monitor
        on disconnect

* Tell remote PC to hangup with a return code of 66 (normal termination)
        send "$HANGUP 66"
        wait until idle

* Update status flag
        define &HSTAT&ASYNCNUM = "HANGUP"

* Otherwise, hangup with OK return code
        hangup 0
^Z
* STARTSES.SCR
*
* FUNCTION: Invokes relay sessions

* Allow script to perform error processing
        on error
        on attnkey F10 &GETOUT = Y

* If RAM exceeded, then provide error message
        on nomemory smsg "qOUT OF MEMORY SESSION";STRACE OFF

* Specifies the session name suffix (ASYNC1) etc.
        &ASYNCNUM = 1

* Iterate # of sessions specified
        loop ASYNC while (&ASYNCNUM <= &NUMPORTS)

* Call subroutine to invoke a new async session
        gosub DOASYNC

* Increment for next async session
        &ASYNCNUM = &ASYNCNUM + 1
-ASYNC
* Terminate script (normal termination)
        quiet stop 0

* This subroutine invokes an async session
-DOASYNC
```

```
* Invoke a new async session and execute script SESSOFF.SCR.
* Assign a session name with ASYNC&ASYNCNUM format where &ASYNCNUM
is the
* current session being invoked.

s e s s i o n    s t a r t
SESSOFF/X:"&ASYNCNUM"/SD:"&APPLDR"/NAME:"ASYNC&ASYNCNUM"/SL:4

* Wait 20 seconds for the session to be established
        wait 20 (&sescount = &calc(&ASYNCNUM + 1))

* If session was not established successfully, then jump to error
routine.
        if timeout then goto NG

* Provide check to make sure session was completely established
before proceeding.
        &XCNT = 1
        loop -CANWAIT1 *
          session status #2 &NX &STX
          if (&rc = 0) then goto CANSTOP1
          wait 1;&XCNT = &XCNT + 1
          if (&XCNT > 45) then goto NG
-CANWAIT1

* Provide error message if session was not established.
-NG
        clear
        open &APPLDR.LOG as #1 for append
        write file #1 "&DATE &TIME Not able to bring up Session
#&ASYNCNUM."
        read line &Q1 "qNot able to bring up Session #&ASYNCNUM.
Press ESCAPE."
        quiet stop 1            ;* return error code
-CANSTOP1

* Return to caller
        return
^Z
* SCRIPT: CONFIG.SCR
*
* FUNCTION: Front-end interface to CONFIG.DAT on error
        clear

* Get script application drive
        &APPLDR = &option(SDRIVE)

* Make sure path is suffixed with a backslash
        if (&substr(&APPLDR, &length(&APPLDR), 1) <> '\') then
&APPLDR = "&APPLDR\"

&MESSAGE = ""
        &PATHSPEC = ""
        &SPEEDCHK = "50, 75, 110, 135, 150, 300, 450, 600, 1200,
1800, 2000, 2400, 3600, 4800, 7200, 9600, 14400, 19200, 38400,"
        &PORTCHK = "COM1, COM2, COM3, COM4, COM5, COM6, COM7, COM8,
HOSTS, IBMSHARE, NONE, IRMA, IBM, FORTE, IBMLDFT, IBMSDFT, SPECIAL,
NPCSHARE, NACSHARE, USER1, USER2, COM3PC, COM4PC, GATEWAY,"
        &MODCHK = "T, CD, 9, H, S, HV, PC, AX, QX, MT, C, P, V, W,
X, R, B, BI, E, US, O, I, M, A, D, HC,"

* If configuration file exists, then continue
        if exists &APPLDR.CONFIG.DAT then goto CONT1
```

* Otherwise, init all vars in panel to blanks
        gosub INITBL 1
        goto CONT3

-CONT1
* Open configuration file
        open &APPLDR.CONFIG.DAT as #1 for input
        &hrc = &RC
        if (&hrc <> 0) then read line &Q1 "qCould not open file
&APPLDR.CONFIG.DAT.  Process aborted.  Press ENTER."
        then stop

* loop to read all records
        &RECCNT = 0
        &ELEM = 1
        loop READREC *
           read file #1 &RECSTR        ;* read a record
           if not found then goto CONT2  ;* if EOF then jump out &RECCNT = &RECCNT + 1 ;* increment record counter

* If 1st record being processed, then assign to path-specification
        if (&RECCNT = 1) then &PATHSPEC = &trim(&RECSTR)
           then goto READREC argstring &RECSTR      ;* break-out tokens
        parse "~" ...          ;* use tilde as delimeter
* Check for illegal # of tokens
        if (&N <> 6) then read line &Q1 "qIllegal # of tokens in
record &ELEM - Record ignored. Press ENTER."
                                                    t    h    e    n
&ENT&ELEM="";&NUM&ELEM="";&SPEED&ELEM="";&PTYPE&ELEM="";&MTYPE&EL
EM="";&NAME&ELEM=""

* Otherwise, assign token from record to panel vars
        else &ENT&ELEM=&trim(&1)
        else &NUM&ELEM=&trim(&2)
        else &SPEED&ELEM=&trim(&3)
        else &PTYPE&ELEM=&trim(&4)
        else &MTYPE&ELEM=&trim(&5)
        else &NAME&ELEM=&trim(&6)
        &ELEM = &ELEM + 1
-READREC -CONT2
* Clear all remaining panel vars
        gosub INITBL &ELEM
        close #1

-CONT3
        display panel CONFIG

-CONT4
        display input &RESPONSE
        if (&RESPONSE <> ESCAPE) and (&RESPONSE <> ENTER) and
(&RESPONSE <> F10)
        then smsg "qInvalid response ..."
        then goto CONT4 if (&RESPONSE = ESCAPE) then smsg "qModifications not saved
... Exiting to DOS."
        then wait 3
        then stop if (&RESPONSE = F10) then gosub HELP1
        then goto CONT4

```
        gosub SAVEDATA
        &hrc = &RC
        if (&hrc = 1) then goto CONT4

* Subroutine to init vars in panel
-INITBL
        &PARM1 = &1
        &CNT = &1
        loop INITA while (&CNT <= 8)

&ENT&CNT="";&NUM&CNT="";&SPEED&CNT="";&PTYPE&CNT="";&MTYPE&CNT=""
;&NAME&CNT=""
            &CNT = &CNT + 1
-INITA
        return

* Subroutine to save panel data
-SAVEDATA

* Make sure receive path is valid
        &PATHSPEC = &trim(&PATHSPEC)
        if (&substr(&PATHSPEC, &length(&PATHSPEC), 1) <> '\') then
&HSPEC = "&PATHSPEC\*.*"
        else &HSPEC = "&PATHSPEC*.*"
        if (&fvalid(&HSPEC) = YES) then goto CONT5
        smsg "qRECEIVE PATH invalid."
        display cursor 1
        return 1

* Validate each entry
-CONT5
        &CNT = 1
        loop VALIDATE 8
           &ENT&CNT = &trim(&ENT&CNT)

* If entry name is null, then get next record
        if (&ENT&CNT = "") then goto INCR

* Validate port #
           &NUM&CNT = &trim(&NUM&CNT)
           if (&NUM&CNT > 0) and (&NUM&CNT < 16) then goto CONT6
           if (&NUM&CNT = "ANY") or (&NUM&CNT = "SHR") then goto
CONT6
           smsg "qInvalid PORT # for Entry Name &ENT&CNT"
           substitute display cursor &calc(&CNT - 1 * 6 + 3)
           return 1

-CONT6
* Validate modem speed
           &SPEED&CNT = &trim(&SPEED&CNT)
           if (&instr("&SPEEDCHK","&SPEED&CNT,") > 0) then goto
CONT7
           smsg "qInvalid MODEM SPEED for Entry Name &ENT&CNT"
           substitute display cursor &calc(&CNT - 1 * 6 + 4)
           return 1

-CONT7
* Validate Port Type
           &PTYPE&CNT = &trim(&PTYPE&CNT)
           if (&instr("&PORTCHK","&PTYPE&CNT,") > 0) then goto CONT8
           smsg "qInvalid PORT TYPE for Entry Name &ENT&CNT"
           substitute display cursor &calc(&CNT - 1 * 6 + 5)
           return 1
```

```
-CONT8
* Validate Modem Type
        &MTYPE&CNT = &trim(&MTYPE&CNT)
        if (&instr("&MODCHK","&MTYPE&CNT,") > 0) then goto CONT9
        smsg "qInvalid MODEM TYPE for Entry Name &ENT&CNT"
        substitute display cursor &calc(&CNT - 1 * 6 + 6)
        return 1

-CONT9
* Validate Modem Name/Class
        &NAME&CNT = &trim(&NAME&CNT)
        if ("&PTYPE&CNT" = "HOSTS") then goto CHECKHST
        else goto INCR

* Since PORT TYPE is HOSTS, make sure MODEM NAME/CLASS has 3 tokens
separted by
* a blank
-CHECKHST if (&NAME&CNT = "") then &FLAGNG = Y
        else &FLAGNG = N
        else argstring &NAME&CNT
        else parse " " ...

if (&N <> 3) or (&FLAGNG = Y) then smsg "qInvalid format
for MODEM NAME/CLASS for Entry Name &ENT&CNT"
        then substitute display cursor &calc(&CNT - 1 * 6 + 7)
        then return 1

-CONT10

-INCR
        &CNT = &CNT + 1
-VALIDATE
* All fields were valid.  Write records to configuration file.
        open &APPLDR.CONFIG.DAT as #1 for output
        &hrc = &RC
        if (&hrc <> 0) then read line &Q1 "qCould not open file
&APPLDR.CONFIG.DAT.  Process aborted.  Press ENTER."
        then stop
        write file #1 "&PATHSPEC"

&CNT = 1
        loop WRITE1 8

* If Entry Name is blank, then don't write this record
        if (&ENT&CNT = "") then goto NEXTREC
                                    write       file      # 1
"&ENT&CNT~&NUM&CNT~&SPEED&CNT~&PTYPE&CNT~&MTYPE&CNT~&NAME&CNT"
-NEXTREC
        &CNT = &CNT + 1
-WRITE1
        close #1
        smsg "qUpdate to configuration file complete..."
        wait 3
        stop

* Help routine
-HELP1
* Make sure user's cursor is on an input field
        if (&substr(&SFIELD,1,1) = "T") or (&substr(&SFIELD,1,1)
= "O") or (&substr(&SFIELD,1,1) = "O")
        then smsg "qWhen selecting help, make sure cursor is on an
input field."
        then return
        &FLD = &substr(&SFIELD,2)          ;* get input field number
```

```
        display save                       ;* save video

* Help for receive file
        if (&FLD = 1) then display panel CONFIGH1
        then goto USERINP
        if ((&FLD \ 6) = 0) then &FLD = 5
        else &FLD = &FLD \ 6 - 1

* Help for entry name
        if (&FLD = "1") then display panel CONFIGH2
        then goto USERINP

* Help for port number
        if (&FLD = "2") then display panel CONFIGH3
        then goto USERINP

* Help for modem speed
        if (&FLD = "3") then display panel CONFIGH4
        then goto USERINP

* Help for port type
        if (&FLD <> "4") then goto CONT11

-CONT12
        display panel CONFIGH5
-CONT13
        display input &RESPONSE
        if (&RESPONSE = ESCAPE) then display restore
        then return
        if (&RESPONSE <> PGDN) then goto CONT13
        display panel CONFIGH6

-CONT14
        display input &RESPONSE
        if (&RESPONSE = ESCAPE) then display restore
        then return
        if (&RESPONSE <> PGUP) then goto CONT14
        goto CONT12

* Help for modem type
-CONT11
        if (&FLD <> "5") then goto CONT15
-CONT16
        display panel CONFIGH7
-CONT17
        display input &RESPONSE
        if (&RESPONSE = ESCAPE) then display restore
        then return
        if (&RESPONSE <> PGDN) then goto CONT17
        display panel CONFIGH8

-CONT18
        display input &RESPONSE
        if (&RESPONSE = ESCAPE) then display restore
        then return
        if (&RESPONSE <> PGUP) then goto CONT18
        goto CONT16

-CONT15
* Help for modem name or class
        if (&FLD <> "0") then goto USERINP
-CONT19
        display panel CONFIGH9
-CONT20
        display input &RESPONSE
        if (&RESPONSE = ESCAPE) then display restore
```

```
           then return
           if (&RESPONSE <> PGDN) then goto CONT20
           display panel CONFIGHA -CONT21
           display input &RESPONSE
           if (&RESPONSE = ESCAPE) then display restore
           then return
           if (&RESPONSE <> PGUP) then goto CONT21
           goto CONT19

* Wait until user presses escape
-USERINP
           display input &RESPONSE
           if (&RESPONSE <> ESCAPE) then goto USERINP
           else display restore
           else return
* Script: REM1.SCR
*
* Function: Main driving script for Remote PC

* Globalize vars
           on error

* Debug on ?
           if (&1 = "DEBUG") then define &DEBUG = "Y"
           then strace newlog
           else define &DEBUG = "N"

* Provide mechnism to allow user to abort via function key F10
           global &GETOUT
           &GETOUT = N
           ON ATTNKEY F10 &GETOUT = Y clear
           smsg "qInitialization in progress ... one moment please."
           global &APPLDR                 ;* application drive
           global &NUMPORTS               ;* # of avail. ports on PC

* Get script application drive
           &APPLDR = &option(SDRIVE)

* Make sure path is suffixed with a backslash
           if   (&substr(&APPLDR,&length(&APPLDR),1)   <>   '\')   then
&APPLDR = "&APPLDR\"

* Read configuration file into RAM vars
           ex REM2

* Check if user pressed F10 to abort
           if (&GETOUT = Y) then goto ALLDONE2

* Start multiple sessions
           ex REM3
           &HRC = &retcode

* If any failures on sessions, then stop script and exit relay
           if (&HRC = 1) then quiet stop all
           smsg "qSession start successful..."

* Erase all files in inbound directory with spec. FILE*.* and
MAP.DAT
           quiet erase &INDIR.FILE*.*
           quiet erase &INDIR.MAP.DAT

* Wait for central PC to call and transfer all files
```

```
          &CNT = 1
          loop INFIN *

* Check if user pressed F10 to abort
          if (&GETOUT = Y) then goto ALLDONE2
* Check if any ports have received confirmation from the central
PC that
* all pending files have been transferred or are in the progress
of being
* transferred
          &CHANGE = N
          loop CHECKST &NUMPORTS

* If debug on, wait 2 seconds so trace doesn't get large
          if (&DEBUG = "Y") then wait 2

* Check if user pressed F10 to abort
          if (&GETOUT = Y) then goto ALLDONE2 if (&HSTAT&CNT <> &OLD&CNT) then &OLD&CNT = &HSTAT&CNT
          then &CHANGE = Y if (&HSTAT&CNT = "DONE") then gosub SHOWDISP
          then goto CHECKAG
          &CNT = &CNT + 1
-CHECKST
          if (&CHANGE = Y) then gosub SHOWDISP
          &CNT = 1
-INFIN

* Wait until all online activity has ended
-CHECKAG
          &CNT = 1
          loop INFIN2 *
            loop CHECKST2 &NUMPORTS

* If debug on, wait 2 seconds so trace doesn't get large
          if (&DEBUG = "Y") then wait 2

* Check if user pressed F10 to abort
          if (&GETOUT = Y) then goto ALLDONE2

* If any online activity detected, then continue checking activity
          if (&HSTAT&CNT = "ONLINE") then &CNT = 1
          then goto -INFIN2
          &CNT = &CNT + 1

-CHECKST2
          goto CONT5
-INFIN2

-CONT5

* Check if we already waited an additional 70 seconds to make sure
all
* online activity was done
          if (&DONEFLAG = Y) then goto ALLDONE

* Set flag
          &DONEFLAG = Y

* Wait 70 seconds in case a line drop occurred and a re-dial was
in progress
*         wait 70
```

```
        goto CHECKAG

-ALLDONE
        clear
                                                    s       m       s       g
"q*---------------------------------------------------------------*"
        smsg "q "
        smsg "q Online file transfer's complete"
        smsg "q "
                                                    s       m       s       g
"q*---------------------------------------------------------------*"
        smsg "q "
        smsg "q "
        smsg "q "

* Join sub-files into master files (if necessary)
        gosub JOIN

-ALLDONE2
* If old online profile existed before application ran, then
restore old profile
* Otherwise erase online profile from relay's directory
        if exists &RUNREL.RELAY.HLD then copyfile &RUNREL.RELAY.HLD
&RUNREL.RELAY.ONP
            then erase &RUNREL.RELAY.HLD
            else &RUNREL.RELAY.ONP

*
* Cancel all sessions
*
        &KILLNUM = 2     ;* init 1st session # to kill

* Loop session #2 to last session
        loop KILLSESS while (&KILLNUM <= &calc(&NUMPORTS + 1))

* Request to kill session
            gosub cancel &KILLNUM
            &HRC = &retcode

&KILLNUM = &KILLNUM + 1
-KILLSESS smsg "qApplication stopped ... Relay Gold has exited
memory."
        quiet stop all            ;* thats it folks !!

-CANCEL  quiet session stop &1
        if (&RC>0) return &RC
        smsg "q "
        smsg "QCancelling session #&1.  Please Stand by."
        global &CANCEL
        &CANCEL = "NO"
        on timer 5 &CANCEL = "YES"

loop -canwait while (&CANCEL="NO")
            quiet session status &1
-CANWAIT      if (&RC>0) goto -CANSTOP -CANSTOP on timer
        return 0

-SHOWDISP
        clear
        &X = 1
        smsg "q                        Communication Status"
```

```
        smsg "q "
                                                        smsg
"q*-----------------------------------------------------------
---------------*"
        loop CHECKST &NUMPORTS
           smsg "qSESSION #&X: &HSTAT&X"
           &X = &X + 1
-CHECKST
                                                        smsg
"q*-----------------------------------------------------------
---------------*"
        return

*-------------------------------------------------------------
------------*
* Subroutine to join multiple files into one file
*-------------------------------------------------------------
------------*
-JOIN

* Load MAP.DAT into RAM
        if not exists &INDIR.MAP.DAT then return smsg "qJoining sub-files into master files ... One moment
please."
        open &INDIR.MAP.DAT as #1 for input
        &HRC = &rc
        if (&HRC <> 0) then smsg "qCould not open MAP.DAT ... Join
aborted."
        then goto DONEJOIN
        &CNT = 1
        loop READIN *
           read file #1 &RECSTR
           if not found then goto DONEMAP
           &MAP&CNT = &RECSTR
           &CNT = &CNT + 1
-READIN
-DONEMAP
        &TOTMAP = &CNT - 1
        close #1

* Take snapshot of all temp files
        dosdir &INDIR.FILE*.* &ENTRYCT &FN &FEXT
        if (&ENTRYCT = 0) then smsg "qTemp files not found ... Join
aborted."
        then goto DONEJOIN

* Sort array by filenames
        sortarray &FN &ENTRYCT ORDER &FEXT
        &CNT = 1

* loop for # of temp files
        loop JOIN1 while (&CNT <= &ENTRYCT)

* Make sure all temp files are found to construct original file
        &PTR = &CNT                          ;* save pointer of
1st record
        &OLDFN = &FN&CNT                     ;* store filename
        &TEMPCNT = 1                         ;* init # of TEMP
files found
        &MAXTEMP = &substr(&FEXT&CNT,2,1)    ;* get total # of
temp files
        loop COUNTEMP *
           &CNT = &CNT + 1
```

```
* If temp filename hasn't changed, then increment temp file counter
          if (&OLDFN = &FN&CNT) then &TEMPCNT = &TEMPCNT + 1

* If temp file counter matches the correct # of temp files for this
original
* file
          if (&TEMPCNT = &MAXTEMP) then goto JOIN2

* If filenames changed, then we didn't receive all temp files
(don't join)
          if (&OLDFN <> &FN&CNT) then goto JOIN1
-COUNTEMP -JOIN2
* Join files
* Get original filename
          &XT = 1
          loop FINDORIG &TOTMAP
                                                                    i    f
(&instr(&substr(&MAP&XT,&calc(&instr(&MAP&XT,",")+1)),&OLDFN)>0)
then goto GOTMATCH
          &XT = &XT + 1
-FINDORIG
-GOTMATCH

* Assign original filename
                                    & N E W N A M E        =
&substr(&MAP&XT,1,&calc(&instr(&MAP&XT,",")-1))
* Open destination file
          open &INDIR.&NEWNAME as #1 for output stream binary
          &HRC = &rc
          if (&HRC <> 0) then smsg "qCould not open file
&INDIR.&NEWNAME. Join aborted."
          then goto JOIN1

* Write temp files to destination file
          &OCNT = &PTR
          loop WRITEOUT &MAXTEMP
              open &INDIR.&FN&OCNT...&FEXT&OCNT as #2 for input
stream binary
          &HRC = &rc
          if (&HRC <> 0) then smsg "qCould not open file
&INDIR.&FN&OCNT...&FEXT&OCNT. Join aborted."
          then smsg "qFile &INDIR.&NEWNAME could not be joined."
          then goto JOIN1 loop WRITE2 *
              read file #2 &RECSTR length 256
              if not found then goto DONE3
              write file #1 &RECSTR
-WRITE2
-DONE3
          close #2
          &OCNT = &OCNT + 1
-WRITEOUT
          close #1

-JOIN1
-DONEJOIN
* Erase any sub-files and mapping file
          quiet erase &INDIR.FILE*.*
          quiet erase &INDIR.MAP.DAT
          return
* SCRIPT: REM2.SCR
*
* FUNCTION: Read configuration and telephone files into RAM vars
```

```
        on error
        on attnkey F10 &GETOUT = Y

* Read configuration file
        if not exists &APPLDR.CONFIG.DAT then clear
        then    smsg    "q&APPLDR.CONFIG.DAT    does    not    exists.
Application cannot continue."
        then read line &Q1 "qPress ENTER."
        then quiet stop all

* Load records in configuration file into vars
        &NUMPORTS = 0                           ;* init # of valid ports open &APPLDR.CONFIG.DAT as #1 for input
        if (&retcode <> 0) then clear
        then    smsg    "qProblem  opening  file  &APPLDR.CONFIG.DAT.
Application cannot continue."
        then read line &Q1 "qPress ENTER."
        then quiet stop all

* Read 1st record (incoming directory)
        read file #1 &XINDIR
        if not found then clear
        then smsg "q1st record in file &APPLDR.CONFIG.DAT must be
incoming directory name."
        then read line &Q1 "qApplication cannot continue.  Press
ENTER."
        then quiet stop all
        &XINDIR = &trim(&XINDIR)
        if  (&substr(&XINDIR,&length(&XINDIR),1)  <>  '\')  then
&XINDIR = "&XINDIR\"

* Make sure incoming directory exists
        quiet mkdir &XINDIR
        substitute define &.INDIR = &XINDIR

* Loop until end of file
        loop READREC *
            read file #1 &RECSTR             ;* read a record
            if not found then goto CONT1     ;* EOF ?

argstring &RECSTR                ;* breakout tokens
            parse "~" ...                    ;* parse using the tilde

* Make sure we have 6 parameters
        if (&N <> 6) then clear
        then    smsg    "qInvalid   #   of   parameters   in   line
#&calc(&NUMPORTS +1) of file &APPLDR.CONFIG.DAT."
        then read line &Q1 "qApplication cannot continue.  Press
ENTER."
        then quiet stop all

* Increment port counter
        &NUMPORTS = &NUMPORTS + 1

* Assign entry name
        substitute define &.EN&NUMPORTS = "&trim(&upper(&1))"

* Assign port #
        global &PORT&NUMPORTS
        &PORT&NUMPORTS = "&trim(&2)"

* Assign modem speed
        global &SPEED&NUMPORTS
        &SPEED&NUMPORTS = "&trim(&upper(&3))"
```

```
* Assign port type
        global &PTYPE&NUMPORTS
        &PTYPE&NUMPORTS = "&trim(&upper(&4))"

* Assign modem type
        global &MODEM&NUMPORTS
        &MODEM&NUMPORTS = "&trim(&upper(&5))"

* Assign modem name/class
        global &MNAME&NUMPORTS
        &MNAME&NUMPORTS = "&trim(&upper(&6))"

* Make sure relay's setting match configuration file
        quiet directory query &EN&NUMPORTS MSPEED &HSPEED TYPE
&HTYPE COMPORT &HPORT
        &HRC = &retcode

* If entry name does not exist, then build it with appropriate
options
        if (&HRC = 2) then gosub BUILDENT
        then goto CONT4

* Make sure modem speed, comm port and type of connection are
correct in Relay's
* Directory of Computers
        if    (&HSPEED   <>   &SPEED&NUMPORTS)   or   (&HPORT   <>
&PORT&NUMPORTS) or (&HTYPE <> "RELAY")
        then   quiet   directory   update   "&EN&NUMPORTS"   MSPEED
&SPEED&NUMPORTS TYPE RELAY COMPORT &PORT&NUMPORTS -CONT4
* Make sure port type, modem type and modem name/class are correct
in Relay's
* personal computer options
        reset &HTYPE;reset &HMODEM;reset &HNAME
        quiet directory qoption comport &PORT&NUMPORTS &HTYPE
&HMODEM &HNAME
        if ("&HTYPE" <> "&PTYPE&NUMPORTS") or ("&HMODEM" <>
"&MODEM&NUMPORTS") or ("&HNAME"<> "&MNAME&NUMPORTS")
        then quiet directory soption comport &PORT&NUMPORTS
&PTYPE&NUMPORTS &MODEM&NUMPORTS "&MNAME&NUMPORTS"

-READREC
-CONT1
        close #1

* Make sure remote PC has at least 1 com port
        if (&NUMPORTS < 1) then clear
        then smsg "qThere must be at least 1 com port for
application to run. Check file"
        then read line &Q1 "q&APPLDR.CONFIG.DAT. Press ENTER."
        then quiet stop all

* Get directory relay gold is running in
        global &RUNREL
        &RUNREL = &RDRIVE
        if  (&substr(&RUNREL,&length(&RUNREL),1)  <>   '\')   then
&RUNREL = "&RUNREL\"

* Copy application online profile to relay's directory
        if exists &RUNREL.RELAY.ONP then copyfile &RUNREL.RELAY.ONP
&RUNREL.RELAY.HLD
        then copyfile &APPLDR.RELAY.ONP &RUNREL.RELAY.ONP
        else copyfile &APPLDR.RELAY.ONP &RUNREL.RELAY.ONP
```

```
* Return control to calling script (normal termination)
        quiet stop

* Subroutine to build an entry in the directory of computers
-BUILDENT

* Build entry name using entry name 'A PC' as the model
        quiet directory add "&EN&NUMPORTS" "A PC"
        &HRC = &retcode

* Entry name 'A PC' not found ?
        if (&HRC = 2) then clear
        then smsg "qEntry Name 'A PC' must be created on your copy
of Relay Gold.  To create"
        then smsg "qa new Entry Name, enter the Directory of
Computers and copy an entry of"
        then read line &Q1 "qTYPE 'PC'.  Then, name the new Entry
Name 'A PC'.  Press ENTER."
        then quiet stop all

* No room on disk ?
        if (&HRC = 3) then clear
        then read line &Q1 "qNo room on disk to create new entry
name.  Press ENTER."
        then quiet stop all
* Update new entry name with proper modem speed, type, comments, quiet   directory   update   "&EN&NUMPORTS"   MSPEED
&SPEED&NUMPORTS TYPE RELAY COMMENTS "PORT #&NUMPORTS FOR SCRIPT"
COMPORT &PORT&NUMPORTS TELEPHONE ""
        return
^Z
* REM3.SCR
*
* FUNCTION: Invokes relay sessions

* Allow script to perform error processing
        on error
        on attnkey F10 &GETOUT = Y

* If RAM exceeded, then provide error message
        on nomemory smsg "qOUT OF MEMORY SESSION";STRACE OFF

* Specifies the session name suffix (ASYNC1) etc.
        &ASYNCNUM = 1

* Iterate # of sessions specified
        loop ASYNC while (&ASYNCNUM <= &NUMPORTS)

* Call subroutine to invoke a new async session
        gosub DOASYNC

* Init session status
        define &HSTAT&ASYNCNUM = "OFFLINE"

* Increment for next async session
        &ASYNCNUM = &ASYNCNUM + 1
-ASYNC
* Terminate script (normal termination)
        quiet stop 0

* This subroutine invokes an async session
-DOASYNC

* Invoke a new async session and execute script REM4.SCR.
```

* Assign a session name with ASYNC&ASYNCNUM format where &ASYNCNUM is the
* current session being invoked.

session         start REM4/X:"&ASYNCNUM"/SD:"&APPLDR"/NAME:"ASYNC&ASYNCNUM"/SL:4

* Wait 20 seconds for the session to be established
        wait 20 (&sescount = &calc(&ASYNCNUM + 1))

* If session was not established successfully, then jump to error routine.
        if timeout then goto NG

* Provide check to make sure session was completely established before proceeding.
        &XCNT = 1
        loop -CANWAIT1 *
          session status #2 &NX &STX
          if (&rc = 0) then goto CANSTOP1
          wait 1;&XCNT = &XCNT + 1
          if (&XCNT > 45) then goto NG
-CANWAIT1

* Provide error message if session was not established.
-NG
        clear
        open &APPLDR.LOG as #1 for append
        write file #1 "&DATE &TIME Not able to bring up Session #&ASYNCNUM."
        read line &Q1 "qNot able to bring up Session #&ASYNCNUM. Press ESCAPE."
        quiet stop 1           ;* return error code
-CANSTOP1

* Return to caller
        return
^Z
* SCRIPT: REM4.SCR
*
* FUNCTION: Places PC in answer mode, performs recoveries etc. for each session
*           on the remote pc

* if debug is on, then invoke trace
        if (&DEBUG = Y) then strace LOG&SESSIONID
        on error
        on nomemory smsg "qOut of memory session # &SESSIONID global &ASYNCNUM

* Assign communications session number
        &ASYNCNUM = &1

* Retrieve communication port # for this session
        directory query &EN&ASYNCNUM comport &HPORT

* Retrieve modem type for this session
        directory qoption comport &HPORT &DUMMY1 &MODEMNAM

* If modem type is QX (Microcom), then set special modem variable to
* submit 'AT' instruction to modem
        if (&upper(&MODEMNAM) = QX) then global &$MICMD
*       then &$MICMD = "\N3\Q3\J0%C3"

```
* For super duper QX/4232hs (latest & greatest).
        then &$MICMD = "%C0%G1%BT12000"

* Place session in answer mode.
-WAITANS
        answer "&EN&ASYNCNUM" ex REM5
        &HRC = &retcode

* Error messages based on return code
* If line dropped before xfer completed, then send file again
        if (&HRC = 99) then &MESSG = "Inadvertent line drop before
file transfer was completed."
        else if (&HRC = 66) then &MESSG = "Normal disconnect from
PC"
        else if (&HRC = 2) then &MESSG = "Insufficient memory for
the connection."
        else if (&HRC = 3) then &MESSG = "Communication port is not
operational."
        else if (&HRC = 4) then &MESSG = "User pressed ESC
cancelling the wait."
        else if (&HRC = 5) then &MESSG = "The modem is not
responding properly."
        else if (&HRC = 6) then &MESSG = "No carrier detected on
line."
        else if (&HRC = 8) then &MESSG = "Voice detected on
telephone line."
        else if (&HRC = 15) then &MESSG = "Entry Name
'&EN&ASYNCNUM' not in the Directory of Computers."
        else if (&HRC = 98) then &MESSG = "Problem with initial
connection."
        smsg "q&MESSG"

* Check for fatal codes
        if (&HRC = 2) or (&HRC = 3) or (&HRC = 4) or (&HRC = 15)

then &MESSG = "Fatal error for Entry Name &EN&ASYNCNUM -
port unusable."
        then smsg "q&MESSG"
        then smsg "qSession idle"
        then quiet stop all

* Check if no more files to be received from central PC
        if (&HRC = 66) then define &HSTAT&ASYNCNUM = "DONE"
        then smsg "qSession idle"
        then quiet stop all

* Place session back into answer mode
        goto WAITANS
^Z
* SCRIPT: REM5.SCR
*
* FUNCTION: Performs online duties for communication session
        on error

* Use relay's compressed protocol (type RC)
*       set protocol relay compress

* Switch to split screen mode
*       switch relay

* If relay's protocol not established in 60 seconds, then hangup wait 60 (&CSERIAL <> "")
        if timeout then hangup 98
```

```
* Use hardware flow control
*       wait 1
*       substi session switch #&calc(&asyncnum + 1)
*       set insmode off           ;* turn off insert mode
*       stack "[ESCAPE][F5][TAB][TAB][TAB][TAB][TAB][TAB]H[enter]"

*       wait 1
        reset &receive            ;* in case any junk chars
*       session switch #1

* If inadvertent line drop occurs, then tell offline script to place in
* answer mode
        on disconnect hangup 99

* If line goes idle for more than 1 minute, then hangup
        on idle 100 hangup 99

* Set inbound path
        set rdrive &INDIR

* Set session status
        define &HSTAT&ASYNCNUM = "ONLINE"

* Set the script control character to hex 24 (char-> $)
        set scriptctl x"24"
        quiet stop
^Z
```

What is claimed is:

1. A parallel rule-based data transmission process comprising the following steps in the sequence set forth:
   (a) establishing at least one data file,
   (b) sensing transmission characteristics of each said data file,
   (c) assigning a unique file identifier to each said data file wherein the file identifier uniquely names each said data file and serves to designate a destination for each said data file,
   (d) performing rule-based segmentation of each said data file by using the transmission characteristics and any available data transmission channels to create data file segments from each said data file and to allocate the data file segments over available data transmission channels, according to segmentation rules,
   (e) assigning file segment identifiers to each said data file segment created by step (d),
   (f) appending an end-of-transmission signal to the data file segment to be transmitted last,
   (g) applying a data compression algorithm to the data file segments to be transmitted,
   (h) simultaneously transmitting a plurality of data file segments over multiple transmission channels,
   (i) simultaneously receiving the plurality of transmitted data file segments at a receiving computer,
   (j) identifying the data compression algorithm applied to the data file segments in step (g),
   (k) decompressing the data file segments according to the data compression algorithm,
   (l) sensing the end-of-transmission signal,
   (m) switching the receiving computer off line,
   (n) reassembling the data file segments based upon the file segment identifiers to reconstruct each said data file, and
   (o) storing each said data file in decompressed, reassembled form.

2. The parallel rule-based data transmission process of claim 1 wherein each said data transmission channel comprises:
   (i) a transmission communication port,
   (ii) a transmission modem electronically connected to the transmission communication ports,
   (iii) a receiving modem,
   (iv) a receiving port electronically connected to the receiving modem, and
   (v) a transmission medium, electronically linking the transmission modem to the receiving modem.

3. The parallel rule-based data transmission process of claim 2 further comprising the steps of:
   sensing data transmission channel conditions on a continuous basis during transmission to determine when a ratio of signal to noise of any single transmission channel falls below a given threshold, indicating a malfunctioning channel; and
   reallocating those data file segments on the sensed malfunctioning channel to transmission channels having a signal to noise ratio which remains above the threshold.

4. The parallel rule-based data transmission process according to claim 3 wherein the data transmission channels are channels selected from the group consisting of serial data transmission channels and parallel data transmission channels.

5. The parallel rule-based data transmission system according to claim 1 for use with a telecommunication standard known as Integrated Services Digital Network.

6. The parallel rule-based data transmission system according to claim 1 wherein the segmentation rules dictate that files below a certain length threshold are not segmented.

7. A parallel rule-based data transmission apparatus comprising:

(a) data transmission channel means having a transmit end and a receive end, for transmitting data file segments created by dividing data files, (b) first data processing means connected to the transmit end, including logic means for applying rule-based software, (c) first data storage means in the first data processing means for storing the data files for segmentation and subsequent transmission, (d) means in the first data processing means for assigning a unique file identifier, the identifier including a file destination, (e) random access memory means in the first data processing means for storing file segmentation rules, (f) file segmentation rules stored in the random access memory means and accessed by the logic means for performing file segmentation of the data files based upon data file characteristics and availability of data transmission channel means, (g) data compression means in the transmit end of the data transmission channel means for compressing the data file segments based upon the data file characteristics, (h) second data processing means connected to the receive end, (i) data decompression means in the receive end of the data transmission channel means for decompressing the compressed data file segments, (j) second data storage means in the second data processing means for storing the decompressed data file segments, and (k) data file reassembly means in the second data processing means to reassemble the transmitted data file segments into the data files, the data files being complete.

8. The parallel rule-based data transmission apparatus according to claim 7 wherein the data transmission channel means comprises:

(i) a transmission communication port on the transmit end, (ii) a transmission modem electronically connected to the transmission communication port, (iii) a receiving modem, (iv) a receiving port on the receive end that is electronically connected to the receiving modem, and (v) a transmission medium, electronically linking the transmission modem to the receiving modem.

9. The parallel rule-based data transmission apparatus according to claim 8 wherein the first data storage means further includes a means for storing a plurality of unique destination identifiers and associated network addresses.

10. The parallel rule-based data transmission apparatus according to claim 9 wherein the unique file identifier includes a file destination on a private data network.

11. The parallel rule-based data transmission apparatus according to claim 9 wherein the unique file identifier includes a file destination on a public switched network.

12. The parallel rule-based data transmission apparatus according to claim 7 wherein the data transmission channel means comprises a plurality of data transmission channels for simultaneously transmitting a plurality of data file segments.

13. The parallel rule-based data transmission apparatus according to claim 12 wherein the first data processing means and the second data processing means comprise logic means for permitting multiple data transmission sessions to occur simultaneously without having to load multiple copies of software in the random access memory.

14. The parallel rule-based data transmission apparatus according to claim 13 wherein the file segmentation rules further comprise rules for least cost routing to reduce transmission costs.

15. The parallel rule-based data transmission apparatus according to claim 13 further comprising emulation means for permitting data transmission between pairs of computer types selected from the group consisting of PC to mainframe, mainframe to mainframe, mainframe to PC, terminal to mainframe, terminal to PC, and terminal to terminal.

16. The parallel rule-based data transmission apparatus according to claim 13 wherein the first data processing means further comprises read only memory for storing rules, logic control parameters, and data communication software instructions.

17. The parallel rule-based data transmission apparatus according to claim 8 wherein the transmission and receiving ports are communications ports selected from the group consisting of parallel computer ports and serial computer ports.

18. The parallel rule-based data transmission system according to claim 7 for use with a telecommunication standard known as Integrated Services Digital Network.

19. The parallel rule-based data transmission system according to claim 7 wherein the segmentation rules dictate that files below a certain length threshold are not segmented.

20. A rule-based parallel data transmission system comprising:

a plurality of data transmission channels for transmitting file segments, each channel having a transmit end and a receive end;

system memory for storing file segmentation rules, the file segmentation rules comprising logic means implemented at the transmit end for controlling the segmentation of files based upon availability of the data transmission channels;

data compression means connected to the transmit end for compressing data transmitted over the data transmission channels;

data decompression means connected to the receive end for decompressing incoming data upon receipt at a destination;

line monitoring means at the transmit end for monitoring a ratio of signal to noise of the data transmission channels; and rules for reallocating data file segments from data transmission channels having a signal to noise ratio which falls below a certain threshold to data transmission channels having a signal to noise ratio which remains above the threshold.

21. The parallel rule-based data transmission system of claim 20 further comprising means for sensing whether the data file segments transmitted are binary or ASCII file segments and means for applying one compression algorithm when binary file segments are sensed and a different compression algorithm when ASCII file segments are sensed.

* * * * *